(12) United States Patent
Wang et al.

(10) Patent No.: US 12,427,927 B1
(45) Date of Patent: Sep. 30, 2025

(54) WELCOME PEDAL AND ELECTRIC PEDAL DEVICE

(71) Applicants: ZHONGSHAN AOD ELECTRONICS TECHNOLOGY CO., LTD., Guangdong (CN); SHANGHAI JIACHANG INDUSTRIAL CO., LTD., Shanghai (CN)

(72) Inventors: Jin Wang, Guangdong (CN); Jingyu Zhang, Guangdong (CN); Xuanmo Guo, Guangdong (CN)

(73) Assignees: ZHONGSHAN AOD ELECTRONICS TECHNOLOGY CO., LTD., Guangdong (CN); SHANGHAI JIACHANG INDUSTRIAL CO., LTD., Shanghai (CN)

( * ) Notice: Subject to any disclaimer, the term of this patent is extended or adjusted under 35 U.S.C. 154(b) by 0 days.

(21) Appl. No.: 18/814,853

(22) Filed: Aug. 26, 2024

(51) Int. Cl.
*B60R 3/02* (2006.01)
*H01M 10/46* (2006.01)
*H01M 50/249* (2021.01)

(52) U.S. Cl.
CPC ............ *B60R 3/02* (2013.01); *H01M 10/46* (2013.01); *H01M 50/249* (2021.01); *H01M 2220/20* (2013.01)

(58) Field of Classification Search
CPC ....... B60R 3/02; H01M 50/249; H01M 10/46; H01M 2220/20
USPC .................................................. 280/163, 66
See application file for complete search history.

(56) References Cited

U.S. PATENT DOCUMENTS

| | | | | |
|---|---|---|---|---|
| 9,205,781 | B1* | 12/2015 | May | B60R 3/02 |
| 10,144,345 | B2* | 12/2018 | Stinson | F21S 9/02 |
| 10,377,300 | B1* | 8/2019 | Salter | B60R 3/002 |
| 11,198,395 | B2* | 12/2021 | Smith | G05D 3/10 |
| 11,945,405 | B2* | 4/2024 | Chen | B60R 3/02 |
| 2008/0100023 | A1* | 5/2008 | Ross | B60Q 1/325 |
| | | | | 280/166 |
| 2016/0347253 | A1* | 12/2016 | Du | B60R 3/02 |
| 2017/0021781 | A1* | 1/2017 | Du | B60R 16/023 |
| 2018/0297530 | A1* | 10/2018 | Stickles | B60R 3/02 |
| 2020/0062183 | A1* | 2/2020 | Smith | G05D 3/10 |
| 2023/0096529 | A1* | 3/2023 | Mendoza Hernández | |
| | | | | B62D 21/15 |
| | | | | 280/163 |

FOREIGN PATENT DOCUMENTS

| | | |
|---|---|---|
| CN | 207311283 U | 5/2018 |
| CN | 209683562 U | 11/2019 |
| CN | 212195270 U | 12/2020 |
| CN | 215322280 U | 12/2021 |
| CN | 219904212 U | 10/2023 |
| JP | 1995228207 A | 8/1995 |

\* cited by examiner

*Primary Examiner* — Hau V Phan
(74) *Attorney, Agent, or Firm* — Ming Jiang; OPENPTO US LLC

(57) ABSTRACT

Welcome pedals and electric pedal devices disclosed herein include a pedal body configured for a driver or passenger to step on, wherein the pedal body has a part for setting a battery, the battery is capable of electrically connecting with a driving device for powering the driving device, and the pedal body is capable of connecting with the driving device, so as to be switchable between an extended state and a retracted state, when driven by the driving device.

15 Claims, 15 Drawing Sheets

WELCOME PEDAL AND ELECTRIC PEDAL DEVICE

CROSS-REFERENCE TO RELATED APPLICATION

This application is based on and claims the benefit of priority from Chinese Patent Application No. 2024107035471, filed on 31 May 2024, the entirety of which is incorporated by reference herein.

TECHNICAL FIELD

The present disclosure relates to the field of vehicle accessories, in particular to a welcome pedal and an electric pedal device.

BACKGROUND

In high-chassis vehicles, pedals are usually installed at a vehicle skirt for easy access of a driver or passenger. Such pedals are classified into two types, i.e., a fixed pedal and an electric pedal. Electric pedal is favored by users since it can be automatically extended when the car doors are opened so as to assist passengers in getting on and off the car, and can be automatically retracted when the car doors are closed. This not only ensures passability of the vehicle, but also maintains a neat appearance and reduces wind resistance of the vehicle.

SUMMARY

A first aspect of the present disclosure provides a welcome pedal, comprising a pedal body configured for a driver or passenger to step on; wherein the pedal body has a part for setting a battery; the battery is capable of electrically connecting with a driving device for powering the driving device; and the pedal body is capable of connecting with the driving device, so as to be switchable between an extended state and a retracted state, when driven by the driving device.

A second aspect of the present disclosure provides an electric pedal device, comprising: a mount configured for being fixed to a side skirt of a vehicle body; a pedal body configured for a driver or passenger to step on; a driving device fixed to the mount and connected to the pedal body, enabling the pedal body to switch between an extended state and a retracted state when driven; and a battery electrically connected to the driving device for powering the driving device.

BRIEF DESCRIPTION OF THE DRAWINGS

In order to more clearly illustrate embodiments of the present disclosure, a brief description of relevant accompanying drawings is given below. Understandably, the accompanying drawings in the following are only intended to illustrate some embodiments of the present disclosure, and that many other technical features and connection relationship, etc. not mentioned herein may be obtained by a person of ordinary skill in the art on the basis of these drawings.

REFERENCE NUMERALS

Figure 1:
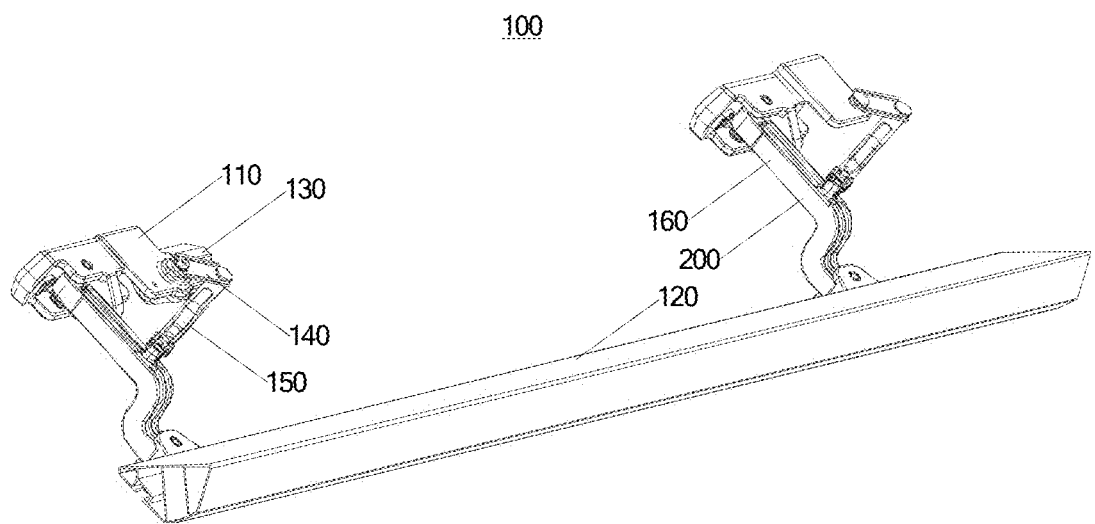
FIG. 1 is a schematic structural view of an electric pedal device provided in some embodiments of the present disclosure in an extended state.

100—electric pedal device, 110—mount, 120—welcome pedal, 121—pedal body, 1211—track slot, 1212—accommodation cavity, 1212a—first inner wall, 1212b—second inner wall, 1212c—curved inner wall, 1213—first cavity, 1214—second cavity, 1215—connection cavity, 1216—upper panel, M—first plane, 1217—lower panel, N—second plane, 1218—first side panel, P—third plane, 1219—second side panel, 1219a—first connection surface, 1219b—second connection surface, 122—slider, 1221—second threaded hole, 1222—threaded through-hole, 123—connecting head, 1231—countersunk hole, 1232—accommodation groove, 124—bolt, 125—preload bolt, 126—cover plate, 1261—shield, 1262—first plug, H—aperture, 1263—pin slot, 1264—spring, 1265—pin, 130—actuator, 131—output shaft, 132—nut, 1311—threaded shaft segment, 1312—frustum shaft segment, 1313—smooth shaft segment, 140—first linkage, 141—flanging, 142—first through-hole, 143—second through-hole, 150—second linkage, 151—first press pattern, 152—third through-hole, 153—fourth through-hole, 154—ball-socket connector, 1541—ball-socket part, 1542—connecting part, 1543—installation hole, 155—reinforcing pin, 156—concave-convex structure, 160—third linkage, 161—second press pattern, 162—third press pattern, 163—ball-head bolt, 1631—ball-head part, 1632—bolt part, 164—first threaded hole, 170—hooded stepped shaft, 171—hooded sleeve, 180—torsion spring, 190—cushion, 200—driving device, 300—battery, 400—battery connecting plate, 410—contact, 420—lead member, 510—lead hole, 520—waterproof rubber plug, 530—through-hole, 600—energizing device, 610—fan blade, 620—generator, 630—linear reciprocating generator, 631—stator, 632—rotor, 700—air vent, 710—filter screen, 720—inlet side, 730—outlet side, O1—first articulation center, O2—second articulation center, O3—third articulation center, O4—rotation center, K1—first ray, K2—second ray, K3—third ray, 1000—carrier.

DETAILED DESCRIPTION

In order to make the purpose, technical solutions and advantages of the present disclosure clearer, the technical solutions of the present disclosure will be described clearly and completely below in conjunction with the specific embodiments and corresponding accompanying drawings. Obviously, the described embodiments are merely a portion of the embodiments of the present disclosure, but not all embodiments. Other embodiments obtained by a person of ordinary skill in the field on the basis of the embodiments in the present disclosure without creative labor will fall within the protection scope of the present disclosure.

A conventional electric pedal device is usually powered by a built-in battery of a vehicle. This design requires a circuitry inside the vehicle for connecting the battery to the electric pedal device. In a vehicle equipped with an electric pedal, an appropriate circuitry needs to be preset during production.

However, the electric pedal device is often offered as an optional accessory. For this reason, some automakers pre-install a power supply wiring during assembly to facilitate future options. This results in an unnecessary additional cost for those cars choosing not to install electric pedals. On the other hand, some automakers choose to add the circuitry and install electric pedals only after the customer has finalized his/her option. While this practice can avoid unnecessary costs, it requires dismantling part of the vehicle's structure to set the circuitry, which is cumbersome and increases labor cost, and may also incur a safety hazard.

Notably, the need for electric pedals is common in transportation vehicles such as a ship or a helicopter, and is also common in devices that simulate conventional carriers, such as operation experience devices simulating the operation experience of a racing car, an airplane or a ship, teaching devices, VR gaming devices, and other types of carriers. For ease of discussion, the present disclosure mainly takes the common vehicle as an example.

Embodiment 1

In respect of the foregoing problems, a first aspect of this embodiment provides a welcome pedal 120, as shown in FIGS. 1, 2, 17 and 18, including a pedal body 121 configured for a driver or passenger to step on. The pedal body 121 has a part for setting a battery 300. The battery 300 can be electrically connected to a driving device 200 for powering the driving device 200. The pedal body 121 is capable of connecting with the driving device 200, so as to be switchable between an extended state and a retracted state when driven by the driving device 200.

Figure 18:
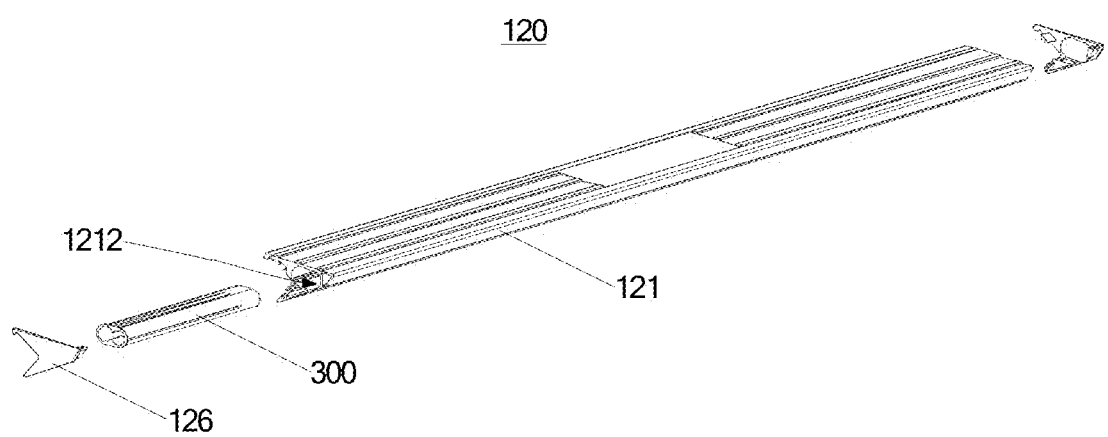
FIG. 18 is an exploded schematic view of a welcome pedal provided in some embodiments of the present disclosure.

In the welcome pedal 120 provided in some embodiments of the present disclosure, the pedal body 121 is designed with a dedicated battery installation site (e.g., accommodation cavity 1212 in FIG. 18). This feature allows the battery 300 on the welcome pedal 120 to directly power the driving device 200, thereby enabling seamless switching of the pedal body 121 between the extended and retracted states. Compared to the prior art, the driving device 200 in this design no longer relies upon the vehicle's built-in battery, but is independently powered by the battery 300 on the pedal body 121, thereby eliminating the step of laying the power supply line between the built-in battery of the vehicle and the driving device. This improvement not only simplifies the installation process and makes the operation easier, but also substantially reduces the material and labor costs. It also facilitates subsequent maintenance and function extension.

Accordingly, a second aspect of this embodiment provides an electric pedal device 100, as shown in FIGS. 1, 2, 17 and 18, including: a mount configured for being fixed to a side skirt of a vehicle body; a pedal body 121 configured for a driver or passenger to step on; a driving device 200, connected to the pedal body 121, enabling the pedal body 121 to switch between an extended state and a retracted state when driven; and a battery 300, provided on the pedal body 121 and electrically connected to the driving device 200 for powering the driving device 200.

The electric pedal device 100 eliminates the step of laying a power supply line between the built-in battery of the vehicle and the driving device 200, thus making the operation simple and convenient, and saving the corresponding material and labor costs.

Furthermore, in this embodiment, the electric pedal device 100 is designed to be relatively independent from a vehicle system, and its power supply comes from the device's own battery 300, but not relies upon the vehicle's built-in power supply. Thus, the electric pedal device 100 can remain functional even if the vehicle malfunctions. Particularly, in some embodiments, the battery 300 of the electric pedal device 100 is removable and can be easily removed by the user for charging. In other embodiments, the battery 300 is fixed within the electric pedal device 100, but the user can still charge it via a dedicated charging port on the electric pedal device 100. This design increases the flexibility and convenience of using the electric pedal device 100.

In some embodiments, the mount 110 is configured for being fixed to a side skirt of the vehicle body. The battery 300 of the electric pedal device 100 may be disposed on any of the pedal body 121 and the mount 110.

Figure 16:
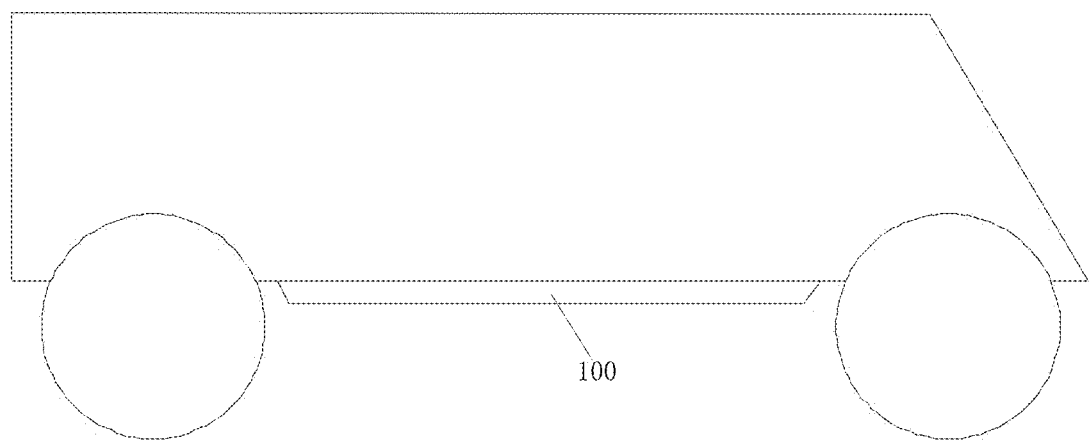
FIG. 16 is a schematic structural view of a carrier provided in some embodiments of the present disclosure.

Accordingly, a third aspect of this embodiment provides a carrier 1000, as shown in FIG. 16, which includes the electric pedal device 100.

It is to be understood that the carrier may be a vehicle, such as a car, a flying machine, a ship, etc. In addition, the carrier 100 referred to in the present disclosure also includes some devices simulating traditional carriers, such as an operation experience device that simulates the operation experience of a racing car, an airplane or a ship, teaching devices, VR gaming devices, and so on, as long as the device can be loaded with a person and needs to be provided with an electric pedal device 100 to facilitate the boarding and alighting.

In some embodiments, the pedal body 121 is formed with an accommodation cavity 1212, arranged along a lengthwise direction of the pedal body 121. The battery 300 can be disposed within the accommodation cavity 1212.

In this embodiment, the accommodation cavity 1212 is embedded inside the pedal body 121, which does not affect basic function of the pedal body 121 and yet provides a dedicated space for the installation of the battery 300. This built-in design not only makes the pedal body 121 a solid shell for the battery 300, thus enhancing protection of the battery 300, but also greatly reduces a direct impact of gravel that may be raised by rolling wheels during travel on the battery 300, and enhances the overall safety, because the battery 300 does not protrude from a surface of the pedal body 121. Such a design scheme effectively balances the needs for functionality and safety.

Figure 22:
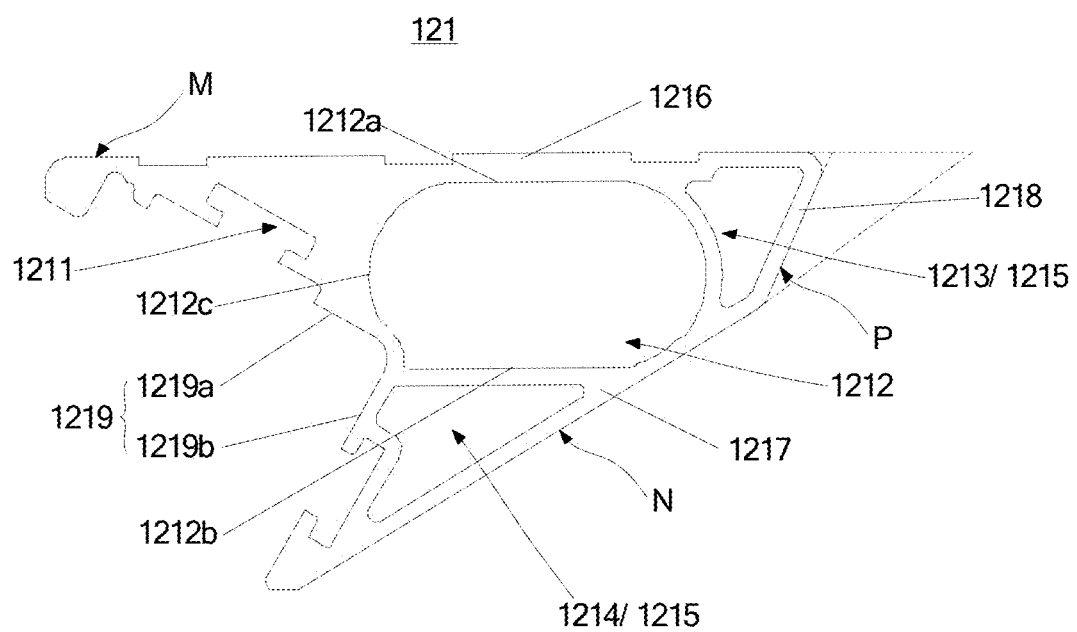
FIG. 22 is a side view of a pedal body provided in some embodiments of the present disclosure.

In some embodiments, as shown in FIG. 22, the pedal body 121 may include: an upper panel 1216 having an upper surface for the driver or passenger to step on; a lower panel 1217, connected to the upper panel 1216 and having a lower surface opposite to the upper surface. A first plane M in which the upper surface lies and a second plane N in which the lower surface lies intersect each other, so that one side of a cross-section of the pedal body 121 has an acute shape. The accommodation cavity 1212 is disposed between the upper panel 1216 and the lower panel 1217.

This design allows the interior space of the pedal body 121 to be maximized so as to accommodate the battery 300, while its inclined lower panel 1217 reduces the space footprint. In addition, this shape is effective in protecting the pedal body 121 from abrasion by a gravel raised by rolling wheels in a vehicle externally-mounted environment.

The inclined design of the lower panel 1217 with its sloping structure not only optimizes the space usage, but also enhances the functionality. When the gravel raised by rolling wheels hits the panel, its inclined angle can effectively reduce the impact force, thereby reducing damage to the panel. Also, the sloping surface guides the gravel to be reflected along a specific path, avoiding any further damage that may be caused by the gravel to the vehicle's undercarriage. This design improves durability while protecting the vehicle's critical components.

Optionally, an angle between an upper surface of the upper panel 1216 and a horizontal plane, when the pedal body 121 is in the extended and retracted states, ranges from 0° to 5°, which may be 0°, 1°, 2°, 3, 4°, and 5°, among others.

Optionally, an angle between an upper surface of the upper panel 1216 when the pedal body 121 is in the extended state and an upper surface of the upper panel 1216 when the pedal body 121 is in the retracted state ranges from 0° to 5°, which may be 0°, 1°, 2°, 3°, 4°, and 5°, among others.

Optionally, the pedal body 121 may move from the retracted state to the extended state by a distance of 100 mm to 250 mm along the lengthwise direction of the pedal body 121, which may be 100 mm, 110 mm, 120 mm, 150 mm, 170 mm, 200 mm, 220 mm, 230 mm, 240 mm and 250 mm, etc. A movement distance of the pedal body 121 along the height direction ranges from 0 mm to 300 mm, which may be 0 mm, 20 mm, 50 mm, 100 mm, 150 mm, 180 mm, 200 mm, 250 mm, 270 mm and 300 mm, etc.

In some embodiments, as shown in FIG. 22, the pedal body 121 may further include a first side panel 1218 and a second side panel 1219. The upper panel 1216 and the lower panel 1217 are connected via the first side panel 1218 at one side, and the upper panel 1216 and the lower panel 1217 are connected via the second side panel 1219 at the other side. The second side panel 1219 is connected to the driving device 200.

Specifically, as shown in FIG. 22, the upper panel 1216, the first side panel 1218, the lower panel 1217, and the second side panel 1219 are connected to each other head-to-tail, to yield a frame structure of the pedal body 121, ensuring sufficient structural strength. The first side panel 1218 is oriented outside of the vehicle body, while the second side panel 1219 is oriented inside of the vehicle body and is connected to the driving device 200, serving as a basis for the driving device 200 to attach. In addition, as shown in FIG. 18, an accommodation cavity 1212 is formed within an enclosed structure formed by the upper panel 1216, the first side panel 1218, the lower panel 1217, and the second side panel 1219 cooperatively, which enables the battery 300 in the accommodation cavity 1212 to be effectively protected, thereby improving its safety.

Notably, in this embodiment, an angle formed between a first plane M and a third plane P in which an outer wall of the first side panel 1218 lies, is larger than an angle formed between a second plane N and the first plane M. In this way, on the one hand, edges of the pedal body 121 oriented outside of the vehicle body are made less sharper, which improves its safety; on the other hand, the angle formed between the third plane P and the first plane M is made larger, which makes the second side panel 1219 have better support performance for the upper panel 1216, and improves its structural strength.

In some embodiments, as shown in FIG. 22, the pedal body 121 may further include: a first cavity 1213, provided between the upper panel 1216, the first side panel 1218 and a cavity wall of the accommodation cavity 1212; and a second cavity 1214, provided between the lower panel 1217, the second side panel 1219, and a cavity wall of the accommodation cavity 1212.

By providing the first cavity 1213 and the second cavity 1214 inside the pedal body 121, a skeletonized structure is obtained. This skeletonized design reduces the material usage and lowers the manufacturing cost. Also, when the structure is subjected to a strong impact, the skeletonized part is able to reduce the damage caused by the impact through collapsing and absorbing energy, and prevent the battery from failure due to deformation, thereby improving the safety and economy of the product.

In some embodiments, as shown in FIG. 22, the second side panel 1219 includes a first connection surface 1219a and a second connection surface 1219b intersecting each other. The first connection surface 1219a makes an angle of less than 90° with the first plane M, and the second connection surface 1219b makes an angle of less than 90° with the second plane N. The first connection surface 1219a and second connection surface 1219b are both provided with a track slot 1211. The driving device 200 is able to access the track slot 1211 and be fastened to the track slot 1211 by a fastener. Herein, the fastener may be a bolt or nut, etc.

As shown in FIG. 22, the pedal body 121 is structured such that an angle between the first connection surface 1219a and the first plane M, and an angle between the second connection surface 1219b and the second plane N, are both less than 90°. Such a design makes the first connection surface 1219a and the second connection surface 1219b as a whole present an L-shaped structure when viewed from a lengthwise direction of the pedal body 121, and makes an angle formed between the first connection surface 1219a and second connection surface 1219b point toward the interior of the pedal body 121, forming an inwardly recessed structure. This structure allows a portion of the driving device 200 connected to the pedal body 121 to occupy partial space of the pedal body 121, which not only helps to reduce a size of the pedal body 121, but also provides precise positioning for installing and connecting the driving device 200, and at the same time makes it possible for the welcome pedal 120 in the extended state to hide the connection structure between the driving device 200 and the pedal body 121, resulting in a more compact and aesthetically pleasing appearance.

In this embodiment, an angle between the first plane M and the second plane N, an angle between the first connection surface 1219a and the first plane M, and an angle between the second connection surface 1219b and the second plane N may all be set to 30°. This design strategy ensures that an angle formed between the first connection surface 1219a and the second connection surface 1219b is 90°, i.e., a right angle. The right-angled L-shaped structure not only conforms to common standard of industrial design, but also provides superior adaptability and a wider range of applications. Notably, though this embodiment adopts 30° for the angle to yield a right angled L-shaped structure, such angles are not fixed, but are adjustable according to actual needs, so as to adapt to different design requirements and application scenarios.

Notably, in this embodiment, the angles between the first plane M and second plane N, between the first connection surface 1219a and first plane M, and between the second connection surface 1219b and second plane N are all set as 30°. This design is made to ensure that the L-shaped structure formed by the first connection surface 1219a and second connection surface 1219b can satisfy the right-angle criterion common in factory design, thereby providing better adaptability and a wider range of applications. Depending on actual needs and conditions in application, specific values of these angles can be appropriately adjusted to adapt to a variety of different engineering environments and requirements.

In this embodiment, as shown in FIG. 22, both the first connection surface 1219a and the second connection surface 1219b are equipped with a track slot 1211 so that the driving device 200 can be smoothly accessed and secured by a fastener. Notably, the pedal body 121 is usually narrow and tightly fitted to a lateral part of the vehicle body. A lengthwise direction of the pedal body 121 usually refers to a direction of the longer side of the pedal body 121, i.e., a direction that coincides with the front-to-back direction of the vehicle body. A height direction of the pedal body 121 is perpendicular to the lengthwise direction and coincides with the up-down direction of the vehicle body. As shown in FIGS. 1 and 22, the track slot 1211 extends along the lengthwise direction of the pedal body 121, allowing the driving device 200 to move along the track slot 1211, thereby realizing flexible adjustment of the connection position and enhancing the installation convenience. This design not only makes the connection position of the driving device 200 adjustable, but also greatly enhances adaptability of the pedal body 121 to different vehicle models.

Considering that the installation position of the electric pedal device 100 varies in different vehicle models, the welcome pedal 120 in this embodiment is capable of adjusting connection position of the driving device 200 through the track slot 1211, to adapt to a variety of vehicle models of different sizes, which realizes the adaptation of the welcome pedal 120 with uniform specification to a variety of vehicle models. In addition, the driving device 200 is fixed to the track slot 1211 by a fastener, which also facilitates the adjustment of connection position, further enhancing the versatility and practicability of the product.

In some embodiments, as shown in FIG. 22, the accommodation cavity 1212 includes a first inner wall 1212a and a second inner wall 1212b parallel to each other, the first inner wall 1212a being parallel to the first plane M. The first inner wall 1212a and the second inner wall 1212b are connected via a curved inner wall 1212c, making a cross-section of the accommodation cavity 1212 present a waist-circular form.

In this embodiment, the first inner wall 1212a is kept parallel to the first plane M, as shown in FIG. 22. This design improves space utilization of the inner wall of the pedal body 121. In some embodiments, the second inner wall 1212b is also designed as parallel to the first inner wall 1212a, ensuring that there are at least two surfaces parallel to each other within the accommodation cavity 1212. Such layout not only facilitates storage of regularly shaped batteries, but also enhances adaptability of the batteries. The regularly shaped batteries are of a common type in the market, and their manufacturing process is mature and safe. Moreover, these batteries are relatively low-cost, contributing to a reduced overall material cost.

In this embodiment, the first inner wall 1212a and second inner wall 1212b are connected via a smooth curved inner wall 1212c, resulting in a waist-circular cross-section of the accommodation cavity 1212. This unique waist-circular design is not only aesthetically pleasing, but also allows the accommodation cavity 1212 to easily fit two side-by-side waist-cylindrical batteries, thereby providing a significant advantage in space utilization. More specifically, in this embodiment, the accommodation cavity 1212 allows two waist-cylindrical batteries to be placed side-by-side, which not only optimizes space occupation, but also reduces friction and facilitates the insertion and removal of batteries 300 because of a smooth nature of the waist-circular cross-section. In addition, the inner wall part of the waist-circular structure enhances structural strength of the pedal body 121, and thus serves as a reinforcing rib. Such improvements not only enhance functionality of the product, but also optimize the manufacturing cost.

Embodiment 2

The present embodiment involves an improvement over the Embodiment 1, in that the battery 300 is provided in a removable form, and a connection structure is provided between the battery 300 and the driving device 200.

Figure 27:
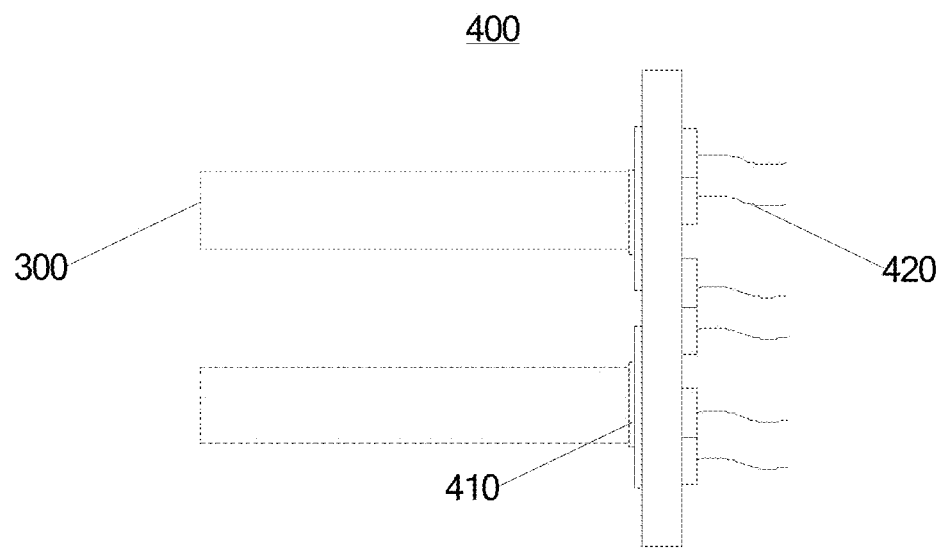
FIG. 27 is a schematic structural view of a battery connecting plate provided in some embodiments of the present disclosure.

Specifically, as shown in FIGS. 18 and 27, the welcome pedal 120 further includes a battery connecting plate 400 provided in the accommodation cavity 1212. When the battery 300 is laid in the accommodation cavity 1212, the battery 300 is able to abut against the battery connecting plate 400 and conduct with a contact 410 of the battery connecting plate 400. The battery connecting plate 400 is connected to the driving device 200 via a lead member 420.

In this embodiment, the batteries 300 are connected via a battery connecting plate 400. This battery connecting plate 400 is provided with a contact 410. When the battery 300 is laid in the accommodation cavity 1212 and abuts against the battery connecting plate 400, it can conduct with the contact 410. This approach avoids traditional hard connection and allows the batteries 300 to be quickly attached to or removed from the battery connecting plate 400, which greatly improves the usability. This not only simplifies an installation process of the battery 300, but also brings great convenience to the replacement and maintenance of the battery 300.

The battery connecting plate 400 is connected to the driving device 200 via a lead member 420. In some embodiments, the lead member 420 may be a wire, a circuit board, or a conductive reed, etc.

Figure 23:
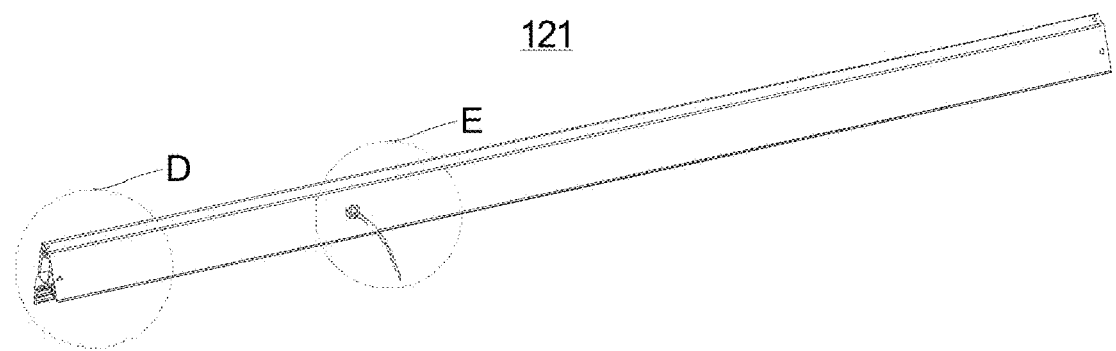
FIG. 23 is a schematic structural view of a pedal body provided in some embodiments of the present disclosure.
Figure 25:
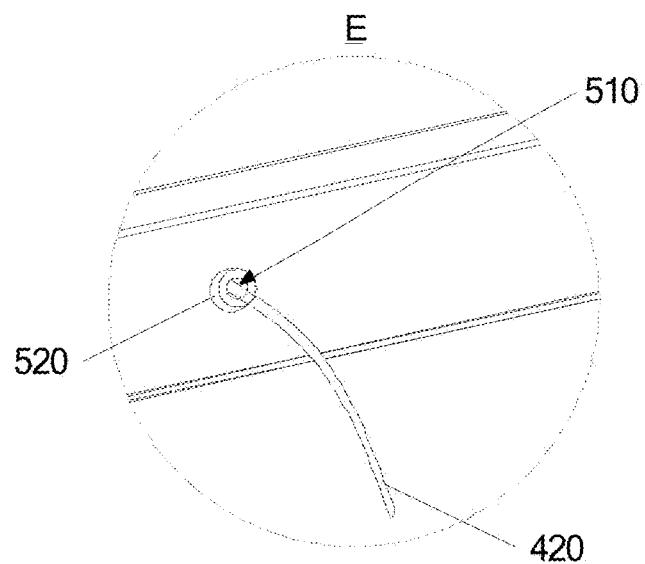
FIG. 25 is a partially enlarged view of the pedal body shown in FIG. 23 at an area E.

Further, as shown in FIGS. 23 and 25, in some embodiments, the pedal body 121 is formed with a lead hole 510 for the lead member 420 to pass through, and a waterproof rubber plug 520 is provided in the lead hole 510. It is to be noted that the lead hole 510 communicates the accommodation cavity 1212 in the pedal body 121 with an external space outside the pedal body 121, to enable the lead member 420 to pass through the lead hole 510 to connect the battery connecting plate 400 disposed in the accommodation cavity 1212 with the driving device 200 outside the pedal body 121. Moreover, since the electric pedal device 100, which is a vehicle externally-mounted device, operates in a relatively harsh environment, the provision of a waterproof rubber plug 520 enables sealing of a gap between the lead hole 510 and the lead member 420, so as to prevent water and dust from entering the accommodation cavity 1212.

In some embodiments, there are at least two batteries 300. The at least two batteries 300 are connected in parallel with each other, and then are connected to the driving device 200 via the battery connecting plate 400.

Figure 31:
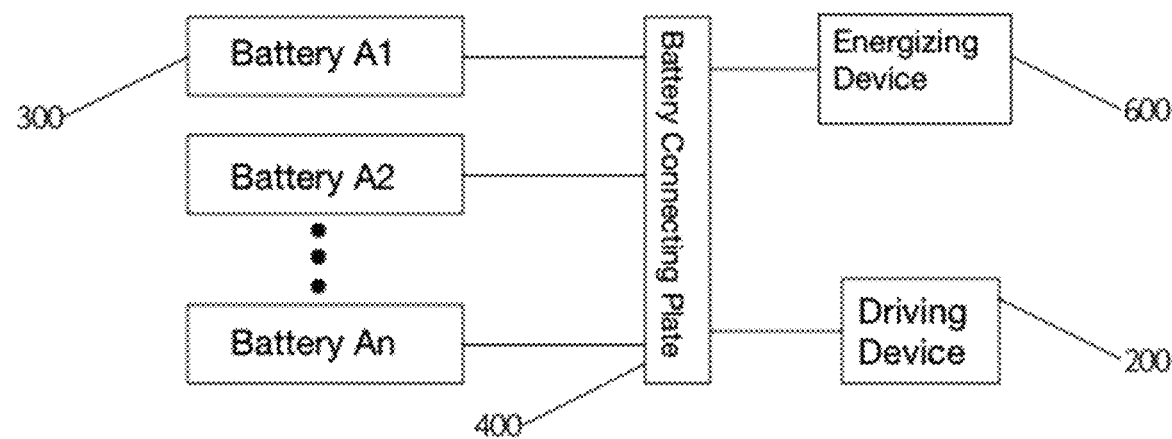
FIG. 31 is a schematic view of a circuit connection for an electric pedal device provided in some embodiments of the present disclosure.

Specifically, in some embodiments, there are two batteries 300, and the two batteries 300 are connected in parallel with each other, and then connected to the driving device 200 via the battery connecting plate 400. This parallel connection allows the two batteries 300 to power the driving device 200 independently or jointly. Thus, even if one battery 300 is removed from charging, the other battery 300 can continue to operate, ensuring continuous operation of the electric pedal device 100. The flexible power management scheme not only improves reliability of the device, but also improves the user experience. As shown in FIG. 31, in some other embodiments, the number of batteries 300 may be greater than two, and the batteries 300 are connected in parallel with each other before being connected to the driving device 200 via the battery connecting plate 400.

In some other embodiments, there are two batteries 300, corresponding to two ends in the lengthwise direction of the pedal body 121, i.e., the two batteries 300 can be taken out from two ends in the lengthwise direction of the pedal body 121, respectively. Accordingly, two batteries 300 each correspond to one battery connecting plate 400, i.e., the batteries 300 are each connected to the corresponding battery connecting plate 400, and two battery connecting plates 400 are connected in parallel with each other and then connected to the driving device 200.

Figure 17:
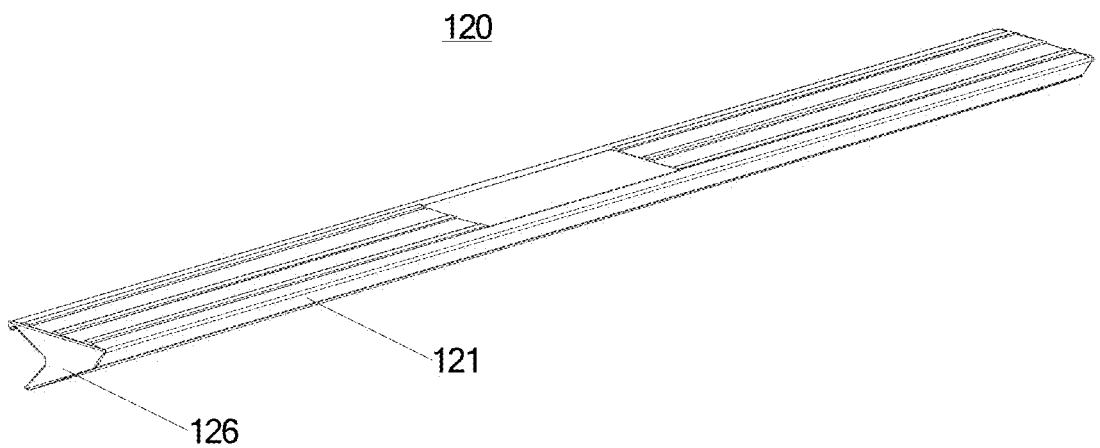
FIG. 17 is a schematic structural view of a welcome pedal provided in some embodiments of the present disclosure.

In some embodiments, the accommodation cavity 1212 extends to an end of the pedal body 121, as shown in FIGS. 17 and 18. The welcome pedal 120 further includes a cover plate 126, which is disposed at the end of the pedal body 121 to cover the accommodation cavity 1212.

Specifically, as shown in FIGS. 17 and 18, the accommodation cavity 1212 extends to an end of the pedal body 121, enabling the battery 300 to be placed into the accommodation cavity 1212 from the end of the pedal body 121 and to smoothly engage with the battery connecting plate 400. The accommodation cavity 1212 is covered by the cover plate 126, which on the one hand prevents foreign matter from entering into the accommodation cavity 1212 and affecting normal use of the battery 300; on the other hand, it can also serve as a decorative plate at the end of the pedal body 121, which protects the battery 300 and also has a decorative effect, improving the aesthetics of the pedal body 121. Notably, the design in which the accommodation cavity 1212 extends to the end ensures stability of the battery 300 when it is placed horizontally, and can effectively prevent the battery from slipping off even during a bumpy driving, thereby enhancing the safety in use.

In other embodiments, the battery 300 may be provided such that it can be taken out from the bottom of the pedal body 121. Specifically, a lower panel 1217 of the pedal body 121 is provided with a slot opening in communication with the accommodation cavity 1212, and the cover plate 126 is disposed over the lower panel 1217 of the pedal body 121 to cover the slot opening.

Figure 19:
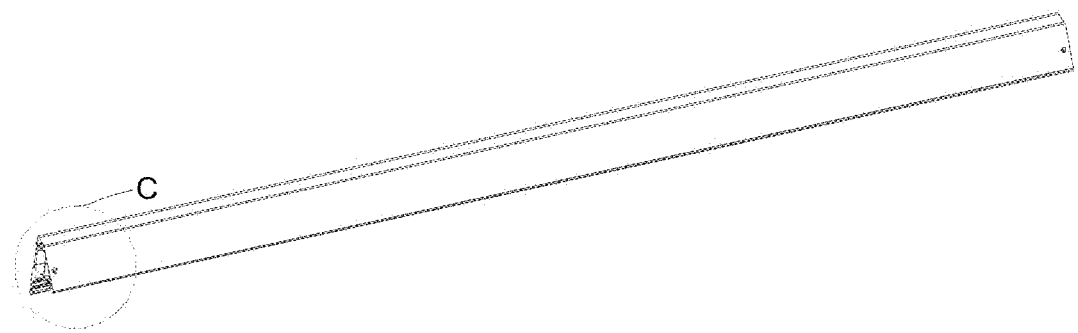
FIG. 19 is a schematic structural view of a pedal body provided in some other embodiments of the present disclosure.
Figure 20:
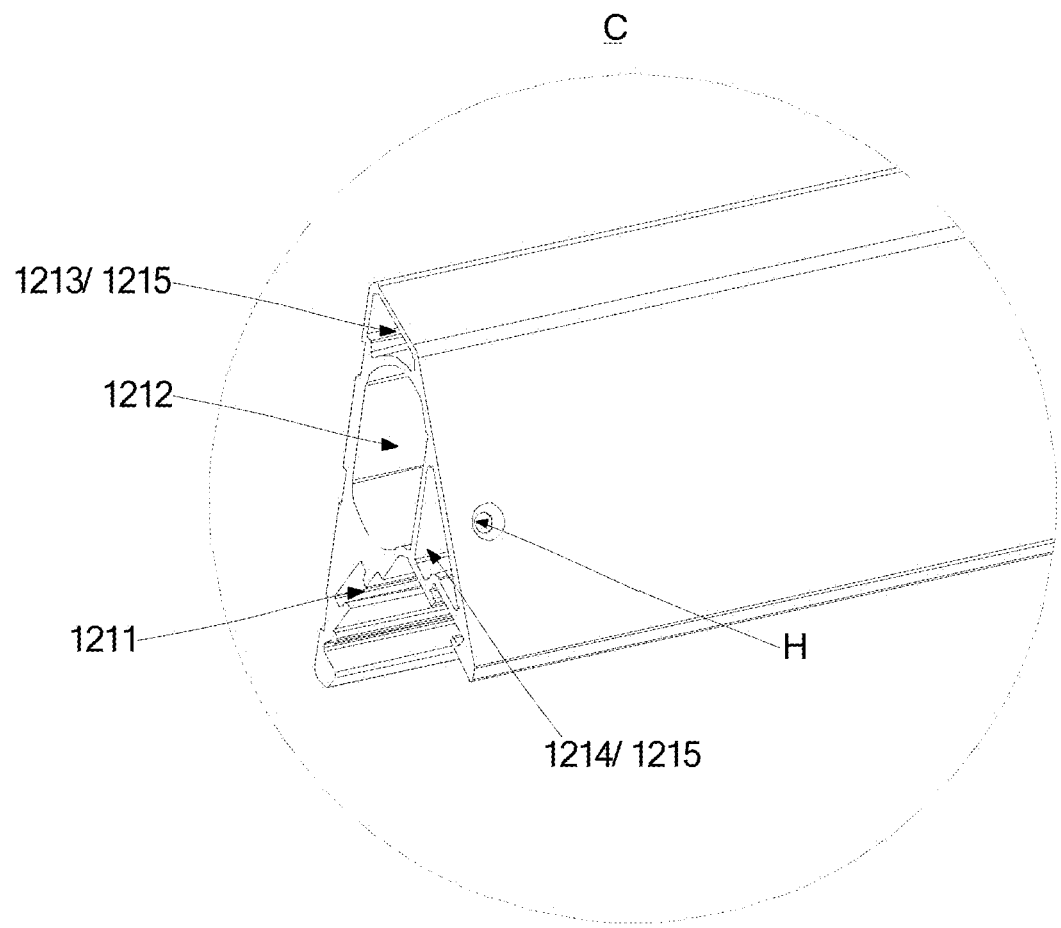
FIG. 20 is a partially enlarged view of the pedal body shown in FIG. 19 at an area C.
Figure 21:
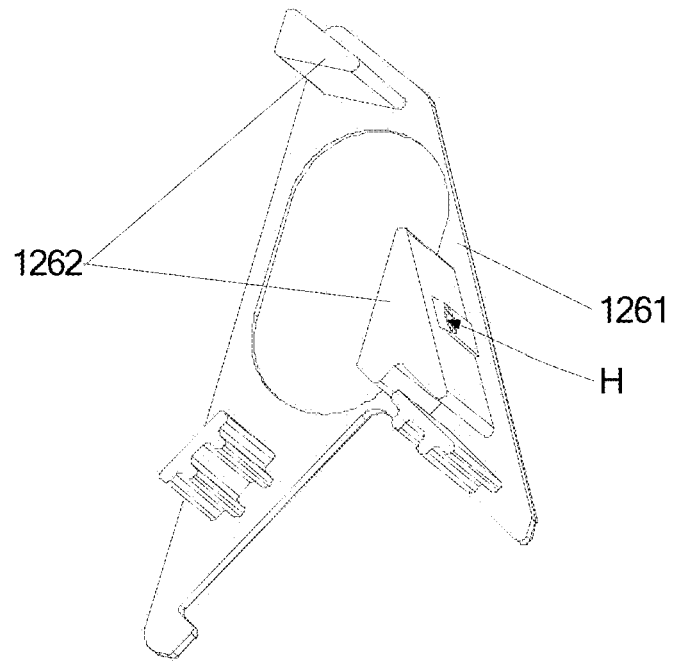
FIG. 21 is a schematic structural view of a cover plate provided in some embodiments of the present disclosure.

In addition, in order to prevent the cover plate 126 from falling off during travel, in other embodiments, as shown in FIGS. 19, 20 and 21, the pedal body 121 is further formed with a connection cavity 1215, which is disposed adjacent to the accommodation cavity 1212 and similarly extends to an end of the pedal body 121. The cover plate 126 includes a shield 1261 and a first plug 1262 provided on the shield 1261. The first plug 1262 is inserted into the connection cavity 1215 to attach the cover plate 126 to the pedal body 121.

In this embodiment, the first plug 1262 is designed to accurately match a dimension of the connection cavity 1215, ensuring that once the first plug 1262 is inserted into the connection cavity 1215, its friction with an inner wall of the connection cavity 1215 can be used to securely position the cover plate 126 at the end of the pedal body 121. In addition, in order to enhance the stability of a connection between the cover plate 126 and an end of the pedal body 121, in some embodiments, a plurality of first plugs 1262 are applied. In some embodiments, the plurality of first plugs 1262 are evenly distributed over the cover plate 126 around the accommodation cavity 1212. They are provided in such a manner as not to impede the function of the accommodation cavity 1212. This design not only improves the structural stability, but also optimizes the overall layout of the assembly.

Notably, in the embodiment shown in FIG. 20, the connection cavity 1215 may be formed of the first cavity 1213 and the second cavity 1214 as described above, i.e., portions of the first cavity 1213 and the second cavity 1214 near an end of the pedal body 121 together constitute the connection cavity 1215 for insertion of the first plug 1262. In other embodiments, the connection cavity 1215 may be provided independently from the first cavity 1213 and second cavity 1214.

In other embodiments, in order to further improve the stability of a connection between the cover plate 126 and an end of the pedal body 121, as shown in FIG. 22, a resilient member is provided at the first plug 1262, and an inner wall of the connection cavity 1215 is raised to form an inner rim approximate to an end of the pedal body 121. The first plug 1262 is interference fit with the inner rim of the connection cavity 1215 via the resilient member, to attach the cover plate 126 to the pedal body 121. It is noted that the resilient member may be a rubber plug or a rubber ring.

In some embodiments, as shown in FIGS. 20 and 21, the first plug 1262 and the pedal body 121 are provided with corresponding apertures H, and at least one of the two apertures H is formed with threads. The first plug 1262 is inserted into the connection cavity 1215 with the two apertures H facing each other, such that a screw can be used to attach the cover plate 126 to the pedal body 121.

In this embodiment, an axial direction of the apertures H forms a specific angle with an insertion direction of the first plug 1262, so that when the screw passes through two apertures H, it can effectively restrict movement of the first plug 1262 along its insertion direction, preventing it from falling off from the connection cavity 1215. At least one of the apertures H is provided with threads to cooperate with a screw to ensure that the screw will not fall off unexpectedly, thus maintaining the stability of the first plug 1262 in the connection cavity 1215. Specifically, in this embodiment, as shown in FIGS. 20 and 21, apertures H in the first plug 1262 are threaded holes for a screw to be fastened, and apertures H in the pedal body 121 are tapered countersunk holes for the screw to pass through and connect with the threaded holes. The tapered countersunk holes are designed to ensure that a tightened screw is flush with a surface of the pedal body 121, thereby maintaining a neat and smooth surface.

Figure 24:
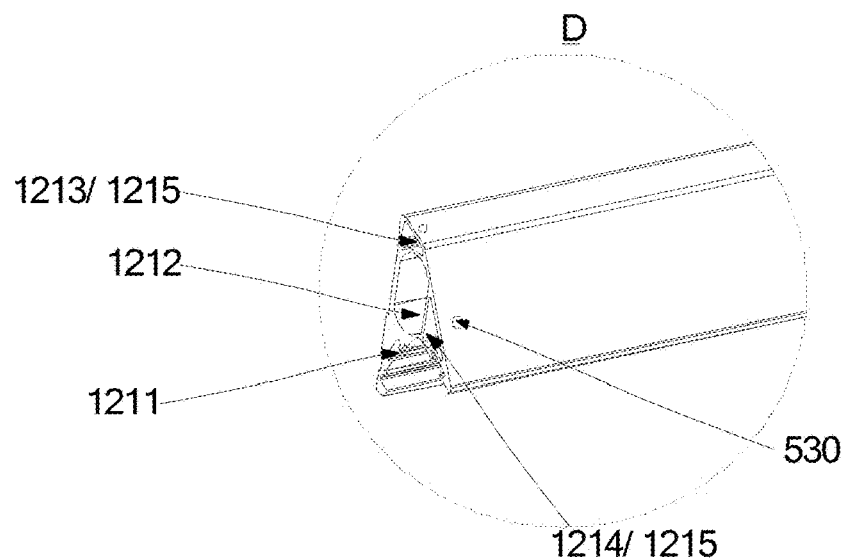
FIG. 24 is a partially enlarged view of the pedal body shown in FIG. 23 at an area D.
Figure 26:
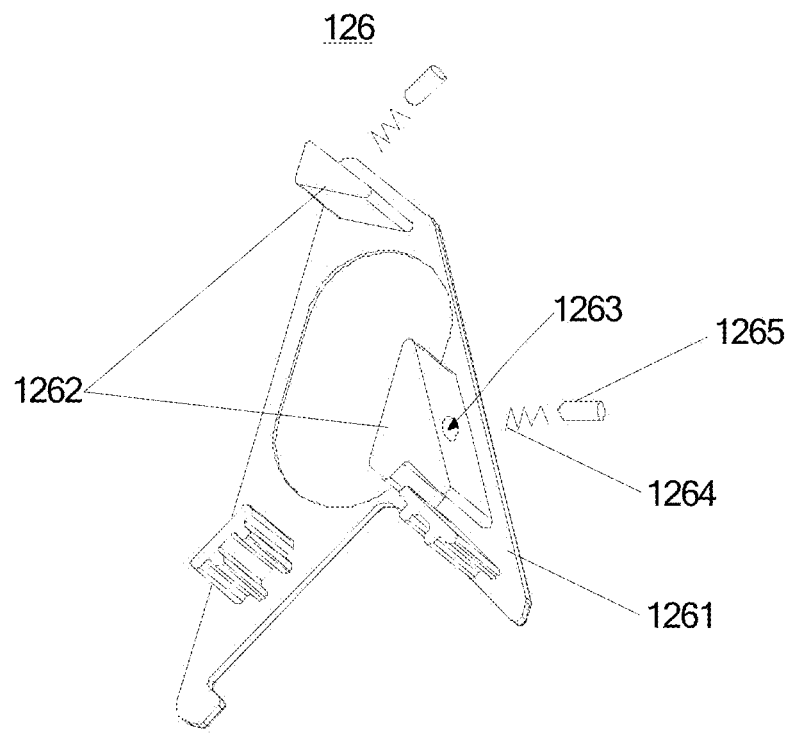
FIG. 26 is a schematic structural view of a cover plate provided in some other embodiments of the present disclosure.

In other embodiments, as shown in FIGS. 23, 24 and 26, the first plug 1262 is provided with: a pin slot 1263; a spring 1264 disposed in the pin slot 1263; a pin 1265 constrained in the pin slot 1263 and connected to the spring 1264, the pin 1265 tending to eject outwardly of the pin slot 1263 under action of the spring 1264. The pedal body 121 is provided with a through-hole 530 corresponding to the pin 1265, and the pin 1265 is able to be inserted into the through-hole 530 when the first plug 1262 is inserted into the connection cavity 1215, to attach the cover plate 126 to the pedal body 121.

Specifically, after the first plug 1262 is inserted into the connection cavity 1215, the pin 1265 firstly contact an inner wall of the connection cavity 1215 and is pushed to urge the spring 1264 until it sinks into the pin slot 1263. After the first plug 1262 is inserted to a designated position in the connection cavity 1215, the pin 1265 may correspond to a position of the through-hole 530; at this time, the pin 1265 pops out and enters the through-hole 530 under the spring's force, because it is no longer constrained by an inner wall of the connection cavity 1215. In this embodiment, the pin slot 1263, the spring 1264, and the pin 1265 on the first plug 1262 together constitute a delicate spring-pin locking mechanism. This structural design allows the first plug 1262 to be quickly and easily inserted into the connection cavity 1215 and locked under an external force, or be easily unlocked and withdrawn, thus realizing quick assembly and disassembly of the cover plate 126 and facilitating the replacement and maintenance of the battery 300.

Embodiment 3

This embodiment involves an improvement made over the Embodiment 2, in that as shown in FIG. 31, the welcome pedal 120 further includes an energizing device 600 that is electrically connected to the battery connecting plate 400 for charging the battery 300.

By provision of the energizing device 600, it is possible to automatically replenish energy for the battery 300 in daily use. This not only reduces power loss of the battery 300, but also reduces the charging frequency, thereby significantly extending a service life of the battery 300. This design is both environmentally friendly and economical, providing users with a more convenient and long-lasting use experience.

Figure 28:
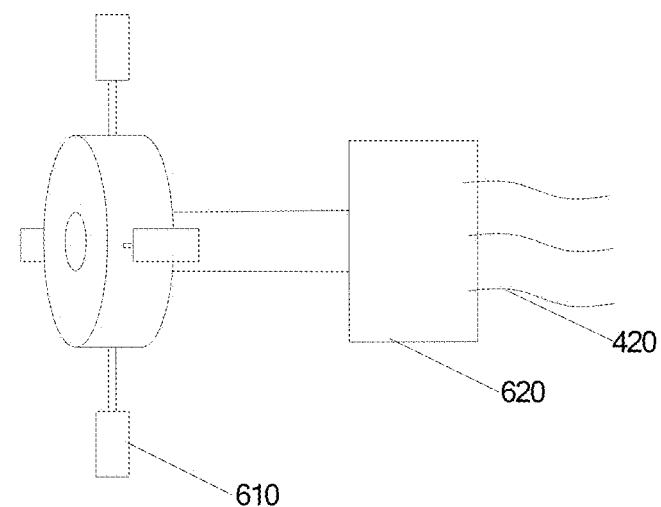
FIG. 28 is a schematic structural view of an energizing device provided in some embodiments of the present disclosure.
Figure 29:
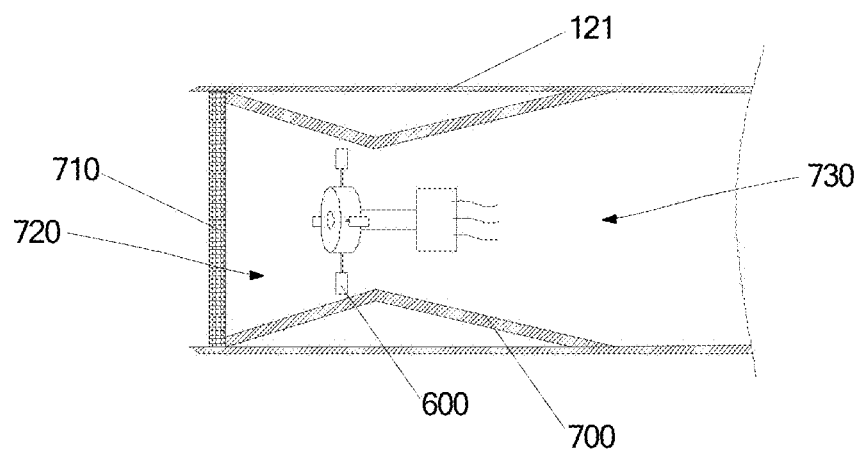
FIG. 29 is a schematic structural view of an air vent provided in some embodiments of the present disclosure.

In some embodiments, the energizing device 600 may be embodied in the form of wind power generation. In this way, wind power can be utilized to charge the battery during travel, thereby taking full advantage of the speed of a travelling vehicle, and the charging efficiency is great. Specifically, as shown in FIGS. 28 and 29, the pedal body 121 is further provided with an air vent 700. The energizing device 600 includes: a fan blade 610 provided in the air vent 700; and a generator 620 provided in the air vent 700 and connected to the fan blade 610. The generator 620 is connected to the battery connecting plate 400 for converting kinetic energy of the fan blade 610 into electrical energy and charging the battery 300.

During travel, air is guided through the air vent 700 to the fan blade 610 lying in the air vent 700 and then drives the fan blade 610 to rotate. The rotating fan blade 610 drives the generator 620 to rotate so as to convert kinetic energy of the fan blade 610 into electrical energy and charge the battery 300.

Further, the air vent 700 has an inlet side 720 and an outlet side 730. The inlet side 720 is provided with a filter screen 710. The air blade 610 is provided at a position of the air vent 700 near the outlet side 730, and a cross-sectional area of the air vent 700 gradually decreases from the inlet side 720 to a position where the air blade 610 is provided, and gradually increases from the position where the air blade 610 is provided to the outlet side 730. In some embodiments, the air vent 700 may be provided in the accommodation cavity 1212.

The filter screen 710 provided at the inlet side 720 can effectively intercept foreign matter to avoid the foreign matter from entering an interior of the air vent 700, thus avoiding damage to the fan blade 610 or affection on its rotation. Moreover, the cross-sectional area of the air vent 700 gradually decreases from the inlet side 720 to the setting position of the fan blade 610, and gradually increases from the setting position of the fan blade 610 to the outlet side 730. This scheme, on the one hand, can effectively increase a wind speed at the fan blade 610 within the air vent 700, thereby enabling wind to drive the fan blade 610 to rotate more efficiently and a higher conversion efficiency; on the other hand, it can reduce the loss of the air's kinetic energy at the air vent 700, thereby further improving the conversion efficiency.

Figure 30:
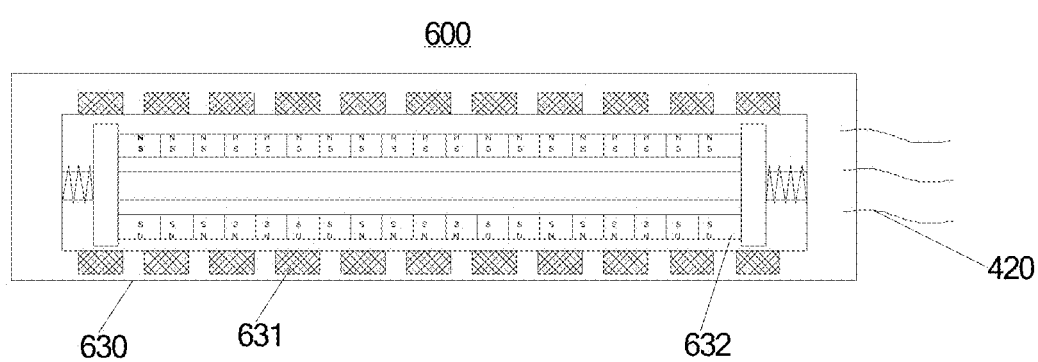
FIG. 30 is a schematic structural view of an energizing device provided in some other embodiments of the present disclosure.

In other embodiments, as shown in FIGS. 18, 30 and 31, an energizing device 600 is provided within the accommodation cavity 1212, such as a linear reciprocating generator 630, which is arranged along the lengthwise direction of the accommodation cavity 1212 and is connected to the battery connecting plate 400. The linear reciprocating generator 630 is used to convert excess kinetic energy of the carrier 1000 where the welcome pedal 120 is located during acceleration and deceleration into electrical energy, and to charge the battery 300.

As seen from the above, the accommodation cavity 1212 is formed in the pedal body 121 and is arranged along the lengthwise direction of the pedal body 121. Accordingly, the linear reciprocating generator 630 is also disposed along a lengthwise direction of the accommodation cavity 1212, i.e., the pedal body 121. This design fully utilizes a space inside the pedal body 121, thereby improving the space utilization efficiency. The placement of a linear reciprocating generator 630 inside the accommodation cavity 1212 not only saves space, but also provides additional protection for the linear reciprocating generator 630, ensuring its safety and stability during use.

As shown in FIG. 30, the linear reciprocating generator 630 in this embodiment may be one of many types of prior art linear reciprocating generators 630, which typically includes a rotor 632 and a stator 631. During acceleration and deceleration of a carrier, the rotor 632 reciprocates in relation to a stator 631 under inertia, and cuts magnetic induction lines during a reciprocating motion, thereby generating electricity. Herein, the rotor 632 may be one of a coil and a magnetic member, and the stator 631 may be the other of a coil and a magnetic member.

Embodiment 4

This embodiment involves an improvement made over the Embodiment 1, Embodiment 2, or Embodiment 3, in the following features. The electric pedal device 100 further includes a mount 110 configured for being fixed to a side skirt of a vehicle body. The driving device 200 is fixed to the mount 110. The driving device 200 includes: an actuator 130 fixed to the mount 110; a first linkage 140; a second linkage 150; and a third linkage 160. One end of one first linkage 140 is transmittingly connected to the actuator 130. One end of one second linkage 150 is transmittingly connected to the other end of the first linkage 140. One third linkage 160 is articulated between the mount 110 and one end of the welcome pedal 120. Another third linkage 160 is articulated between the mount 110 and the other end of the welcome pedal 120. The other end of the one second linkage 150 is transmittingly connected to the third linkage 160.

Under actuation of the actuator 130 in a first direction, the welcome pedal 120 is capable of outward swinging and downward shifting, bringing the welcome pedal 120 into the extended state. Under actuation of the actuator 130 in a second direction, the welcome pedal 120 is capable of inward swinging and upward shifting, bringing the welcome pedal 120 into the retracted state.

In this way, the electric pedal device 100 can adapt to vehicle models with particularly high chassis, assisting the driver or passenger in entering and exiting the vehicle comfortably.

In this embodiment, the battery 300 is provided at the pedal body 121, particularly inside the pedal body 121. In some other embodiments, the battery 300 may be provided on the mount 110 or another structure.

Figure 2:
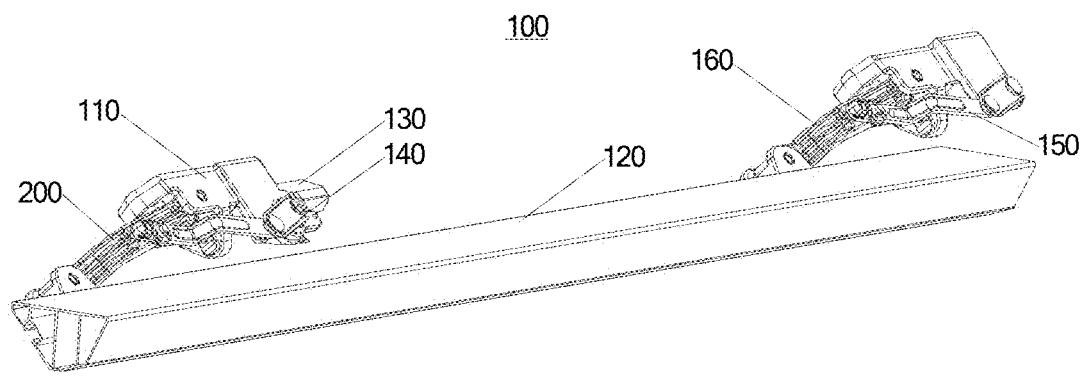
FIG. 2 is a schematic structural view of an electric pedal device provided in some embodiments of the present disclosure in a retracted state.

Reference is made to FIG. 1 which is a schematic structural view of an electric pedal device provided in some embodiments of the present disclosure in an extended state, and FIG. 2 which is a schematic structural view of an electric pedal device provided in some embodiments of the present disclosure in a retracted state. The electric pedal device 100 may include, but not be limited to, a mount 110, a welcome pedal 120, an actuator 130, a first linkage 140, a second linkage 150, and a third linkage 160. The mount 110 is configured for being fixed to a side skirt of a vehicle body. The welcome pedal 120 is configured for a driver or passenger to step on. The actuator 130 is fixed to the mount 110. One end of one first linkage 140 is transmittingly connected to the actuator 130. One end of one second linkage 150 is transmittingly connected to the other end of the first linkage 140. One third linkage 160 is articulated between the mount 110 and one end of the welcome pedal 120. Another third linkage 160 is articulated between the mount 110 and the other end of the welcome pedal 120. The other end of one second linkage 150 is transmittingly connected to a third linkage 160. Herein, under actuation of the actuator 130 in the first direction, the welcome pedal 120 is capable of outward swinging and downward shifting, bringing the welcome pedal 120 into the extended state. Under actuation of the actuator 130 in the second direction, the welcome pedal 120 is capable of inward swinging and upward shifting, bringing the welcome pedal 120 into the retracted state.

Since the mount 110 of the electric pedal device 100 is fixed to a side skirt of the vehicle body, driving of the linkage assembly may cause the welcome pedal 120 to realize the downward shifting along with outward swinging, or the upward shifting along with inward swinging, which may lead to extension and retraction of the welcome pedal 120. Therefore, the electric pedal device 100 is suitable for the vehicle model with a particularly high chassis, and is able to assist the driver and passenger in entering and exiting the vehicle comfortably. Further, a height of the welcome pedal 120 from the ground upon extension can be altered by adjusting a driving stroke of the actuator 130 to meet various needs of drivers and passengers. Further, as the electric pedal device 100 needs not to be installed at the vehicle's chassis, it will not affect the ground clearance and passability of the vehicle. In addition, as the linkage assembly consisting of the first linkage 140, second linkage 150 and third linkage 160 owns a large transmission ratio, the electric pedal device 100 may have a strong ice-breaking ability and can overcome the problem of starting difficulty.

The first direction refers to one of a clockwise direction and a counterclockwise direction. The second direction refers to the other one of the clockwise and counterclockwise directions.

The outward swinging means swinging away from the vehicle body, while the inward swinging means swinging close to the vehicle body. The upward shifting means moving away from the ground, while the downward shifting means moving closer to the ground.

Optionally, the actuator 130 may be a motor assembly, including a motor and a reduction gearbox. The reduction gearbox may be a planetary gearbox. The actuator 130 may include a worm gear and a worm engaged with each other. The worm gear and the worm may act as a self-locking mechanism.

Optionally, when the welcome pedal 120 transforms from the retracted state to the extended state, the third linkage 160 is rotated at an angle ranging from 80° to 100°, which may be 80°, 82°, 85°, 87°, 90°, 93°, 95°, 97°, and 100°, among others.

Figure 3:
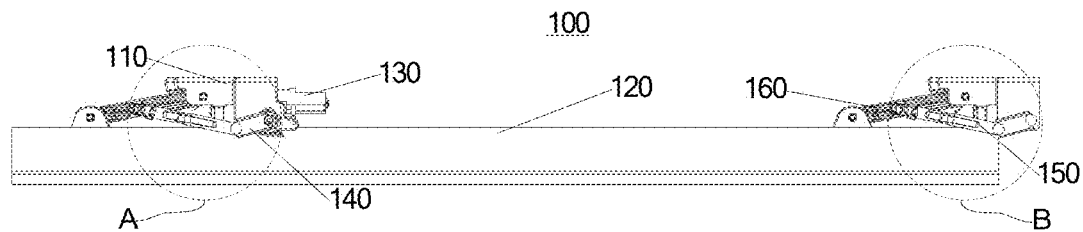
FIG. 3 is a front view of the electric pedal device shown in FIG. 2 in some embodiments.
Figure 4:
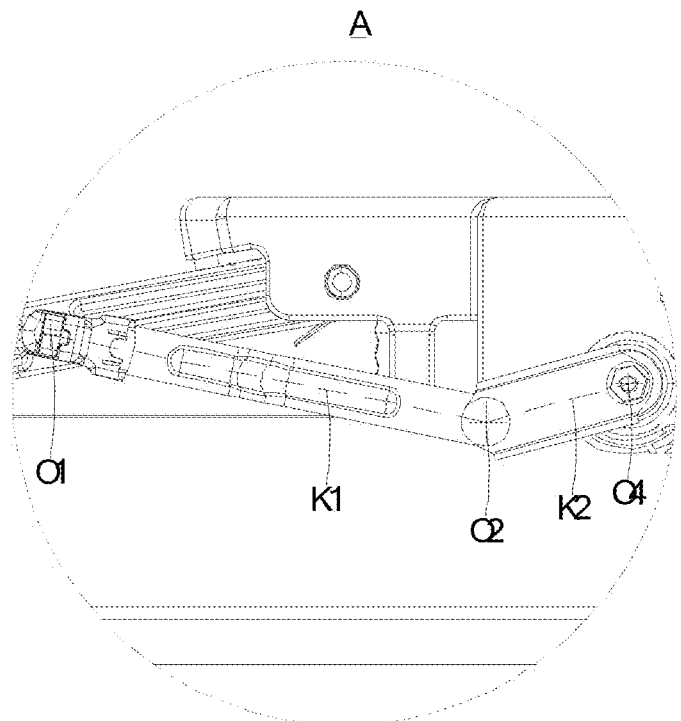
FIG. 4 is a partially enlarged view of the electric pedal device shown in FIG. 3 at an area A.
Figure 5:
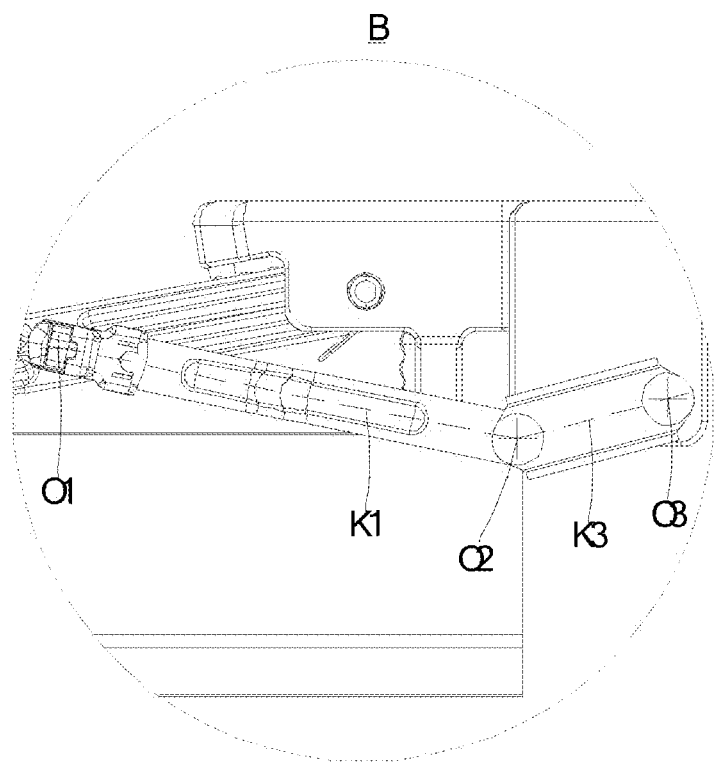
FIG. 5 is a partially enlarged view of the electric pedal device shown in FIG. 3 at an area B.

Reference is made to FIG. 3 which is a front view of the electric pedal device of FIG. 2 in some embodiments, FIG. 4 which is a partially enlarged view of the electric pedal device of FIG. 3 at an area A, and FIG. 5 which is a partially enlarged view of the electric pedal device of FIG. 3 at an area B. The other end of the second linkage 150 is articulated with a structure between two ends of the third linkage 160 to form a first articulation center O1. One end of the second linkage 150 is articulated with the other end of the first linkage 140 to form a second articulation center O2. One end of one first linkage 140 is transmittingly connected to an output shaft 131 of the actuator 130 to drive the welcoming pedal 120 via the second linkage 150 and the third linkage 160, thereby driving the welcome pedal 120 to be extended or retracted.

Further, one end of the other first linkage 140 is articulated to the mount 110 to form a third articulation center O3. One end of the other second linkage 150 is articulated to the other end of the other first linkage 140 to form a second articulation center O2. The other end of the other second linkage 150 is articulated to a structure between two ends of the other third linkage 160 to form a first articulation center O1.

Further, a ray starting at the second articulation center O2 and passing through the first articulation center O1 is defined as the first ray K1. A ray starting at the second articulation center O2 and passing through a rotation center O4 of the output shaft 131 is defined as the second ray K2. A ray starting at the second articulation center O2 and passing through the third articulation center O3 is defined as the third ray K3.

When the welcome pedal 120 is in the retracted state, the first articulation center O1, the second articulation center O2, and the rotation center O4 of the output shaft 131 are arranged on the same straight line. Alternatively, when the welcome pedal 120 is in the retracted state, an angle between the first ray K1 and the second ray K2 is greater than or equal to 175°, and less than or equal to 180°. The above-described setting renders the third linkage 160 to be in a self-locking state under the gravity of the third linkage 160 and the welcome pedal 120.

Further, when the welcome pedal 120 is in the retracted state, the first articulation center O1, the second articulation center O2, and the third articulation center O3 are arranged on the same straight line. Alternatively, when the welcome pedal 120 is in the retracted state, an angle between the first ray K1 and the third ray K3 is greater than or equal to 175°, and less than or equal to 180°. The above-described setting can enhance self-locking of the third linkage 160.

Figure 6:
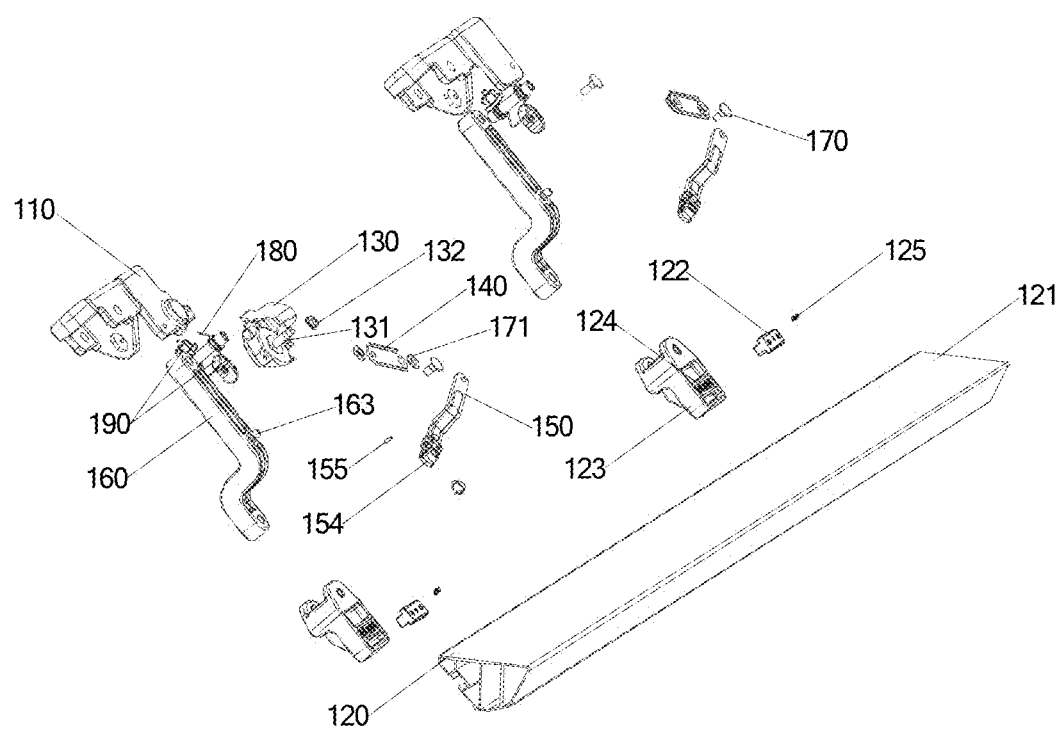
FIG. 6 is an exploded schematic view of an electric pedal device provided in some embodiments of the present disclosure.

Reference is made to FIG. 1, FIG. 2 and FIG. 6, which is an exploded schematic view of an electric pedal device provided in some embodiments of the present disclosure. The electric pedal device 100 further includes a cushion 190, which is fixed to the mount 110. When the welcome pedal 120 is in the extended state, one side of the third linkage 160 abuts against the cushion 190 to eliminate shaking and abnormal sound, maintaining the welcome pedal 120 in the extended state steadily. The cushion 190 also plays a cushioning role to protect the welcome pedal 120 when the welcome pedal 120 in the extended state is subjected to collision. When the welcome pedal 120 is in the retracted state, the other side of the third linkage 160 abuts against another cushion 190 to eliminate shaking and abnormal sound, maintaining the welcome pedal 120 in the retracted state steadily.

Further, the electric pedal device 100 includes a torsion spring 180. The torsion spring 180 is provided at an articulated joint between the third linkage 160 and the mount 110. One end of the torsion spring 180 is fixed to the mount 110, and the other end of the torsion spring 180 is fixed to the third linkage 160.

When the electric pedal device 100 is in the retracted state, a force of the torsion spring 180 urges one side of the third linkage 160 to always abut against the cushion 190, thereby enhancing self-locking of the third linkage 160 and eliminating gaps, shaking and abnormal sound. When the electric pedal device 100 is in the extended state, a force of the torsion spring 180 urges the other side of the third linkage 160 to always abut against another cushion 190, thus eliminating gaps, shaking and abnormal sound. Meanwhile, the torsion spring 180 also plays a cushioning role when the welcome pedal 120 in the extended state is subjected to collision, thus protecting the actuator 130 and the welcome pedal 120.

Optionally, the torsion spring 180 may be a double torsion spring.

Figure 7:
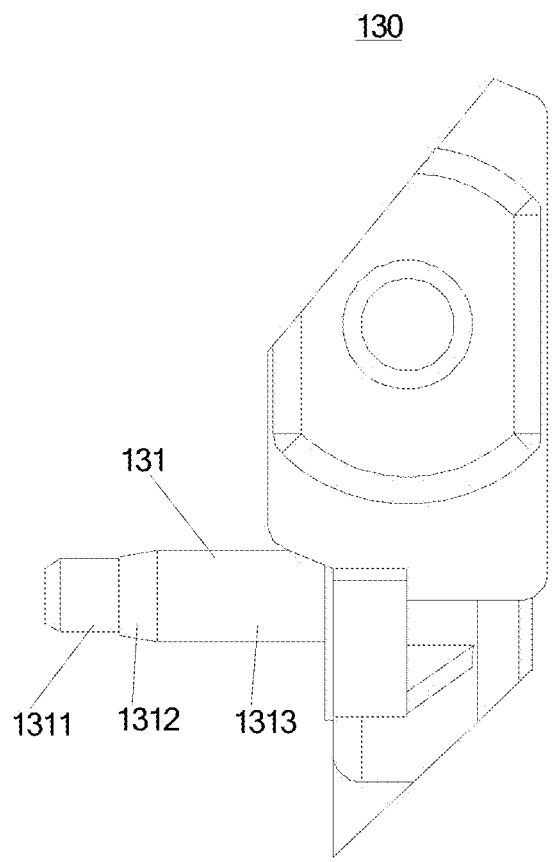
FIG. 7 is a schematic structural view of an actuator provided in some embodiments of the present disclosure.

Reference is made to FIG. 7 which is a schematic structural view of an actuator provided in some embodiments of the present disclosure. The output shaft 131 of the actuator 130 may include, but not be limited to, a threaded shaft segment 1311, a frustum shaft segment 1312, and a smooth shaft segment 1313 sequentially connected with each other. The threaded shaft segment 1311, the frustum shaft segment 1312, and the smooth shaft segment 1313 are arranged on the same center axis. A small diameter end of the frustum shaft segment 1312 faces the threaded shaft segment 1311, and a large diameter end of the frustum shaft segment 1312 faces the smooth shaft segment 1313. The major diameter of the threaded shaft segment 1311 is smaller than the small diameter of the frustum shaft segment 1312.

Figure 8:
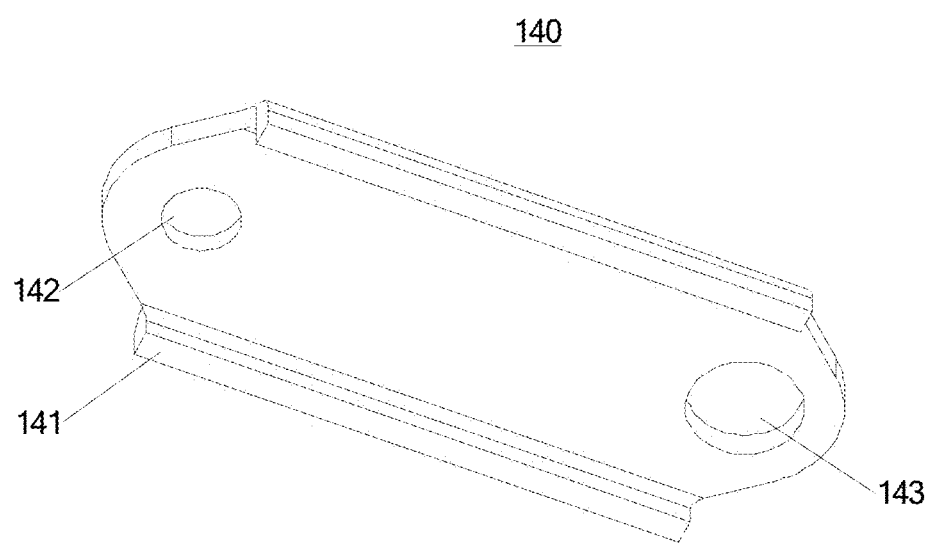
FIG. 8 is a schematic structural view of a first linkage provided in some embodiments of the present disclosure.

Reference is made to FIG. 7 and FIG. 8, which is a schematic structural view of a first linkage provided in some embodiments of the present disclosure. One end of the first linkage 140 is provided with a first through-hole 142. The first through-hole 142 has a diameter that is larger than a small diameter of the frustum shaft segment 1312 and smaller than a large diameter of the frustum shaft segment 1312. The other end of the first linkage 140 is provided with a second through-hole 143. Flangings 141 are provided on two sides of the first linkage 140 to enhance the strength of the first linkage 140.

Referring to FIGS. 6-8 in combination, the threaded shaft segment 1311 of the output shaft 131 passes through the first through-hole 142 of the first linkage 140. The electric pedal device 100 further includes a nut 132. The nut 132 is screwed to the threaded shaft segment 1311 to press one end of the first linkage 140 against the frustum shaft segment 1312, thereby making a connection between the first linkage 140 and the output shaft 131 more secure and reliable.

Figure 9:
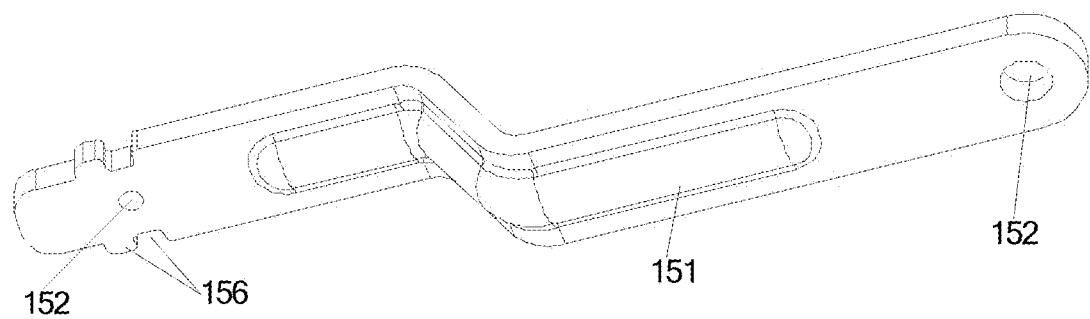
FIG. 9 is a schematic structural view of a second linkage provided in some embodiments of the present disclosure.

Reference is made to FIG. 9, which is a schematic structural view of a second linkage provided in some embodiments of the present disclosure. One end of the second linkage 150 is provided with a third through-hole 152. The other end of the second linkage 150 is provided with a fourth through-hole 153. A structure between two ends of the second linkage 150 is provided with a first press pattern 151 to enhance the strength of the second linkage 150.

Referring to FIGS. 6, 8 and 9 in combination, the electric pedal device 100 further includes a hooded stepped shaft 170 and a pair of hooded bushings 171. The pair of hooded bushings 171 are sleeved opposite to each other onto a larger shaft of the hooded stepped shaft 170. The larger shaft of the hooded stepped shaft 170 is threaded through a second through-hole 143 of the first linkage 140. The other end of the first linkage 140 is sleeved between a pair of hooded bushings 171. A smaller shaft of the hooded stepped shaft 170 is threaded through a third through-hole 152 of the second linkage 150.

Further, a shaft cap of one hooded bushing 171 is sandwiched between a shaft cap of the hooded stepped shaft 170 and the other end of the first linkage 140 to increase the area for force transmission. The smaller shaft of the hooded stepped shaft 170 is interference fit with one end of the second linkage 150, allowing the hooded stepped shaft 170 to drive the second linkage 150. The shaft cap of the other hooded shaft sleeve 171 is clamped between one end of the second linkage 150 and the other end of the first linkage 140 to increase the area for force transmission.

Further, one end of the second linkage 150 abuts against a step of the hooded stepped shaft 170 to achieve the positioning and assembly.

Figure 10:
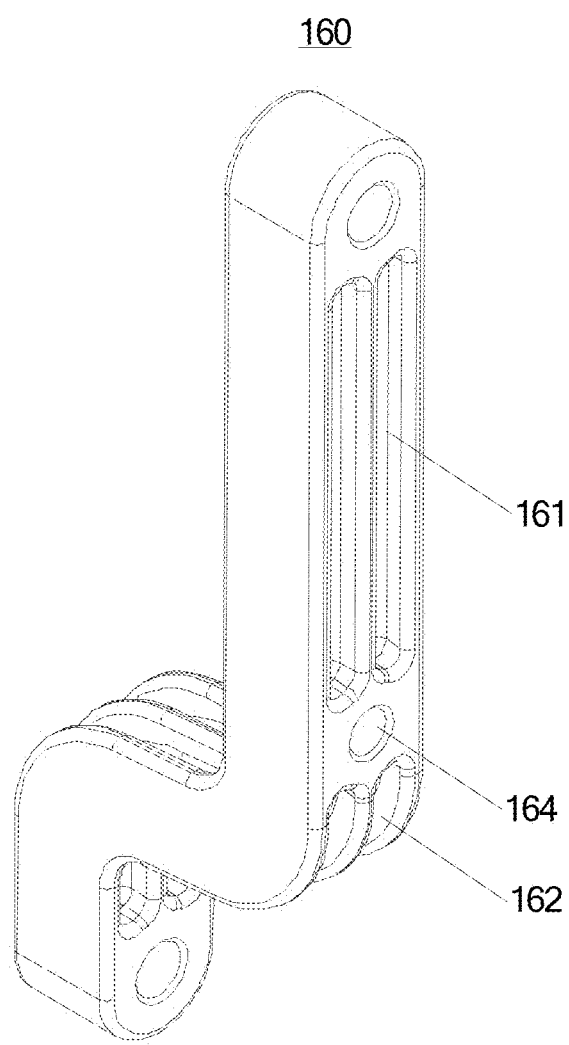
FIG. 10 is a schematic structural view of a third linkage provided in some embodiments of the present disclosure.

Reference is made to FIG. 1, FIG. 6 and FIG. 10, which is a schematic structural view of a third linkage provided in some embodiments of the present disclosure. A structure between two ends of the third linkage 160 is provided with a first threaded hole 164. A second press pattern 161 is provided between an articulated joint of the third linkage 160 with the mount 110 and a driven connection of the third linkage 160 with the second linkage 150, to enhance the strength of the third linkage 160. A third press pattern 162 is provided between the driven connection of the third linkage 160 with the second linkage 150 and an articulated joint of the third linkage 160 with the welcome pedal 120 to enhance the strength of the third linkage 160.

Figure 11:
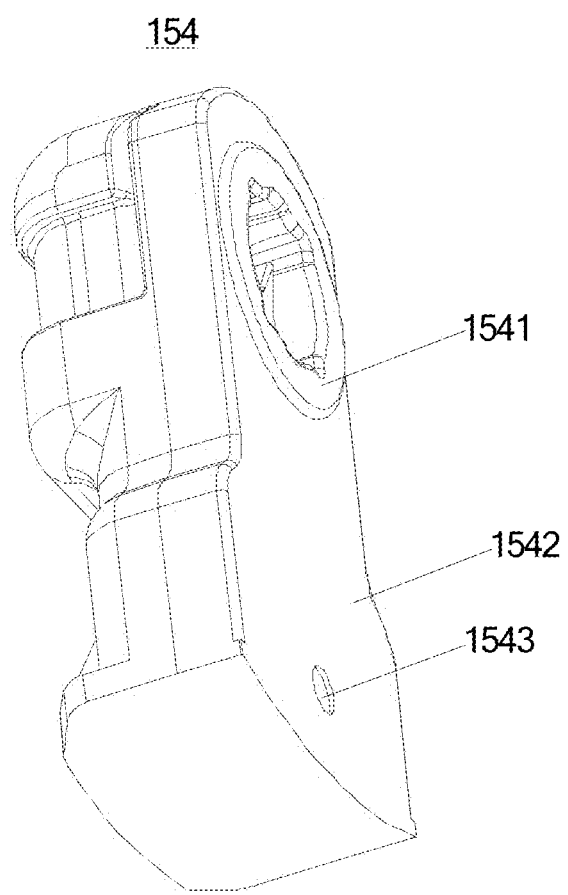
FIG. 11 is a schematic structural view of a ball-socket connector provided in some embodiments of the present disclosure.

Reference is made to FIG. 6 and FIG. 11, which is a schematic structural view of a ball-socket connector provided in some embodiments of the present disclosure. The electric pedal device 100 further includes a ball-socket connector 154. The ball-socket connector 154 may include, but not be limited to, a ball-socket part 1541 and a connecting part 1542 connected with one another. The connecting part 1542 is provided with an installation hole 1543.

Figure 12:
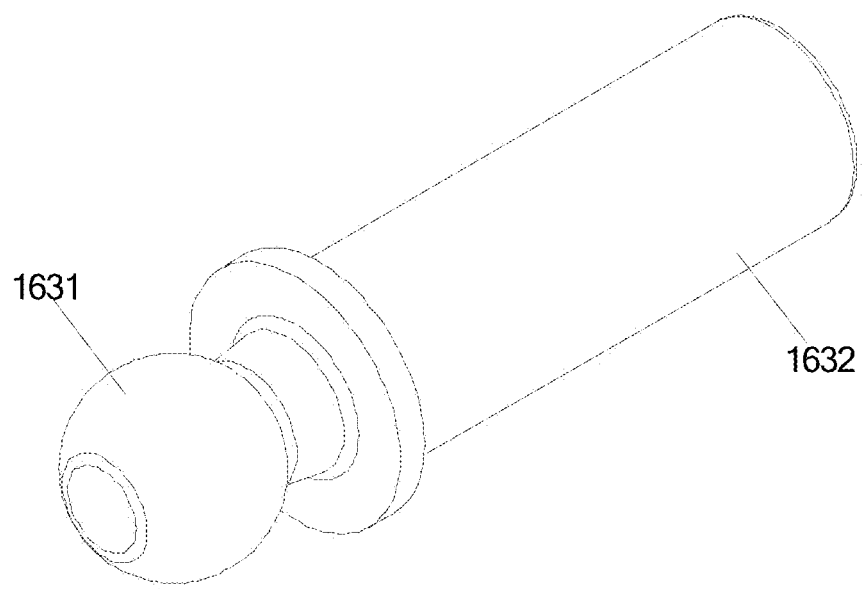
FIG. 12 is a schematic structural view of a ball-head bolt provided in some embodiments of the present disclosure.

Reference is made to FIG. 6 and FIG. 12, which is a schematic structural view of a ball-head bolt provided in some embodiments of the present disclosure. The electric pedal device 100 further includes a ball-head bolt 163. The ball-head bolt 163 may include, but not be limited to, a ball-head part 1631 and a bolt part 1632 connected with each other.

Referring to FIGS. 1, 6 and 9-12 in combination, the other end of the second linkage 150 is inserted into the connecting part 1542 of the ball-socket connector 154. A part of the second linkage 150 inserted into the connecting part 1542 is provided with at least a pair of opposing concave-convex structures 156 to increase the stressed area between the second linkage 150 and the connection part 1542. The ball-head bolt 163 is ball-articulated to the ball-socket connector 154. Specifically, the ball-head part 1631 of the ball-head bolt 163 is ball-articulated to the ball-socket part 1541 of the ball-socket connector 154. The bolt part 1632 of the ball-head bolt 163 is screwed to the first threaded hole 164 of the third linkage 160.

Further, the electric pedal device 100 includes a reinforcing pin 155. The reinforcing pin 155 is threaded through the installation holes 1543 of the connecting part 1542 and through the fourth through-hole 153 of the second linkage 150, so as to enhance the strength of a connection between the second linkage 150 and the connecting part 1542.

Figure 13:
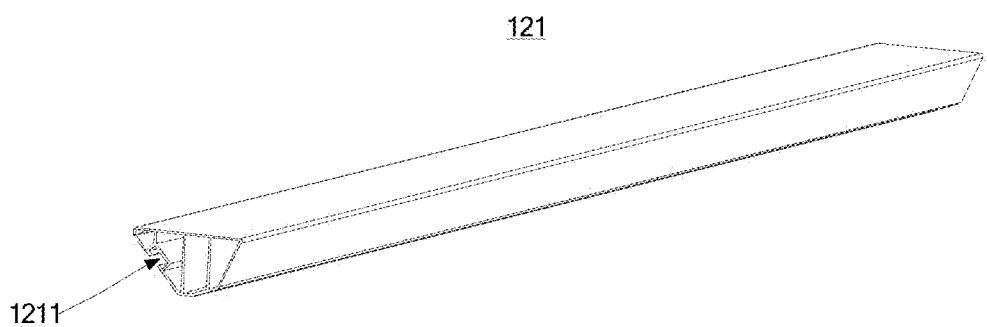
FIG. 13 is a schematic structural view of a pedal body provided in some embodiments of the present disclosure.

Reference is made to FIG. 13 which is a schematic structural view of a pedal body provided in some embodiments of the present disclosure. The pedal body 121 is provided with a track slot 1211 for installing a slider 122 in an adjustable way.

Figure 14:
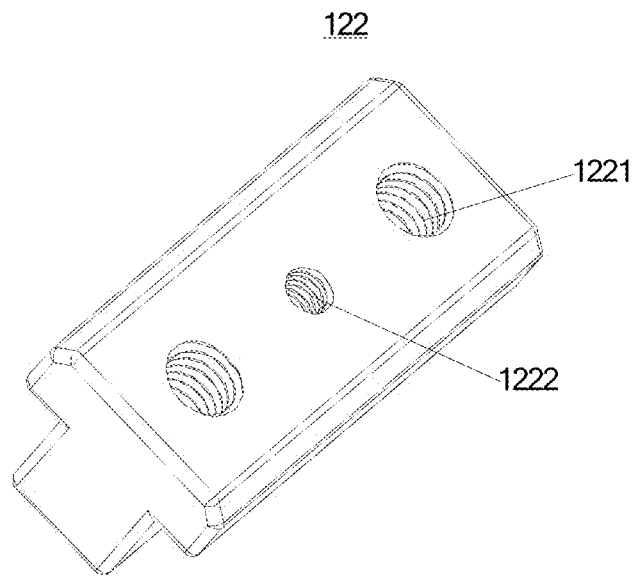
FIG. 14 is a schematic structural view of a slider provided in some embodiments of the present disclosure.

Reference is made to FIG. 14 which is a schematic structural view of a slider provided in some embodiments of the present disclosure. The slider 122 is a T-shaped slider. The slider 122 includes a bottom and a belly connected with each other. The slider 122 is provided with a second threaded hole 1221 and a threaded through-hole 1222.

Figure 15:
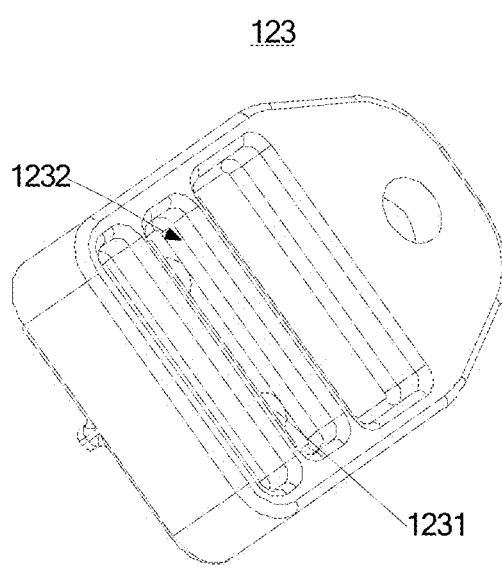
FIG. 15 is a schematic structural view of a connecting head provided in some embodiments of the present disclosure.

Reference is made to FIG. 1, FIG. 6 and FIG. 15, which is a schematic structural view of a connecting head provided in some embodiments of the present disclosure. One end of the connecting head 123 is articulated to the third linkage 160. The other end of the connecting head 123 is provided with a countersunk hole 1231. The connecting head 123 is also provided with an accommodation groove 1232 in communication with the countersunk hole 1231.

Referring to FIGS. 1, 6 and 13-15 in combination, the welcome pedal 120 may include, but not be limited to, a pedal body 121 and a slider 122. The driving device includes a connecting head 123. The slider 122 is provided in a track slot 1211 of the pedal body 121 to slidably adjust the installation position. Specifically, the bottom of the slider 122 is provided in a track slot 1211 of the pedal body 121. The belly of the slider 122 is partially accommodated in the accommodation groove 1232 of the connecting head 123 to enhance the connection strength.

The welcome pedal 120 further includes a preload bolt 125. The preload bolt 125 is screwed to the threaded through-hole 1222 of the slider 122, so that the slider 122 is pre-tensioned against the pedal body 121.

The welcome pedal 120 also includes a bolt 124. The bolt 124 passes through a countersunk hole 1231 of the connecting head 123, and is screwed to a second threaded hole 1221 of the slider 122, such that the pedal body 121 is fastened to the connecting head 123.

The electric pedal device 100 provided in the present disclosure includes: a mount 110 configured for being fixed to a side skirt of a vehicle body; a welcome pedal 120 configured for a driver and passenger to step on; an actuator 130 fixed to the mount 110; a first linkage 140, one end of one first linkage 140 being transmittingly connected to the actuator 130; a second linkage 150, one end of one second linkage 150 being transmittingly connected to the other end of the first linkage 140; a third linkage 160, one third linkage 160 being articulated between the mount 110 and one end of the welcome pedal 120, and another third linkage 160 being articulated between the mount 110 and the other end of the welcome pedal 120, the other end of one second linkage 150 being transmittingly connected to one third linkage 160; wherein, under actuation of the actuator 130 in a first direction, the welcome pedal 120 is capable of outward swinging and downward shifting, bringing the welcome pedal 120 into the extended state; under actuation of the actuator 130 in a second direction, the welcome pedal 120 is capable of inward swinging and upward shifting, bringing the welcome pedal 120 into the retracted state. In this way, the electric pedal device 100 can be applied to vehicle models with particularly high chassis, thus assisting the drivers or passengers in entering and exiting the vehicle comfortably.

It is apparent to those skilled in the art that the present disclosure is not limited to the details of the above exemplary embodiments, but can be realized in other forms without departing from the spirit or essential features of the present disclosure. Thus, the foregoing embodiments shall be regarded as exemplary and non-limiting in any point of view, and the scope of the present disclosure is limited only by the appended claims rather than the description, and is therefore intended to encompass all variations falling within the meaning and scope of the equivalents of claims. Furthermore, any appended markings in the claims shall not be regarded as limitation on the claims to which they relate.

We claim:

1. A welcome pedal for vehicle comprising:
a pedal body configured for a driver or passenger to step on;
wherein the pedal body has a part for setting a battery;
the battery is capable of electrically connecting with a driving device for powering the driving device; and
the pedal body is capable of connecting with the driving device, so as to be switchable between an extended state and a retracted state, when driven by the driving device;
wherein the pedal body is formed with an accommodation cavity arranged in a lengthwise direction of the pedal body, the battery being capable of lying in the accommodation cavity;
the pedal body comprises:
an upper panel having an upper surface configured for the driver or passenger to step on; and
a lower panel connected with the upper panel and having a lower surface opposite to the upper surface;
wherein a first plane in which the upper surface lies and a second plane in which the lower surface lies intersect each other, so that one side of a cross-section of the pedal body has a acute shape;
the accommodation cavity is provided between the upper panel and the lower panel;
wherein the welcome pedal further comprises a battery connecting plate provided in the accommodation cavity, so that the battery, when placed in the accommodation cavity, is capable of abutting against the battery connecting plate and conducting with a contact of the battery connecting plate;
the battery connecting plate is connected to the driving device via a lead member;
the pedal body is provided with a lead hole for the lead member to pass through;
wherein the pedal body is further formed with an air vent;
the welcome pedal further comprises: an energizing device electrically connected with the battery connecting plate for charging the battery;
the energizing device comprises:
a fan blade, provided in the air vent;
a generator, provided in the air vent and connected to the fan blade, the generator being connected to the battery connecting plate for converting kinetic energy of the fan blade into electrical energy and charging the battery.

2. The welcome pedal according to claim 1, wherein the pedal body further comprises a first side panel and a second side panel, one side of the upper panel and one side of the lower panel are connected via the first side panel, and the other side of the upper panel and the other side of the lower panel are connected via the second side panel;
wherein the second side panel is connected with the driving device;
an angle formed between the first plane and a third plane in which an outer wall of the first side panel lies is greater than an angle formed between the second plane and the first plane.

3. The welcome pedal according to claim 2, wherein the second side panel has a first connection surface and a second connection surface intersecting each other, an angle formed between the first connection surface and the first plane is less than 90°, and an angle formed between the second connection surface and the second plane is also less than 90°; the first connection surface and the second connection surface are each provided with a track slot, and the driving device is capable of accessing the track slot and being fastened to the track slot by a fastener.

4. The welcome pedal according to claim 1, wherein the accommodation cavity extends to an end of the pedal body;
the welcome pedal further comprises a cover plate, which is disposed at the end of the pedal body to cover the accommodation cavity.

5. The welcome pedal according to claim 4, wherein the pedal body further comprises a connection cavity, which is provided adjacent to the accommodation cavity and extends to the end of the pedal body;
the cover plate includes a shield and a first plug provided on the shield; the first plug is inserted into the connection cavity, to attach the cover plate to the pedal body.

6. The welcome pedal according to claim 5, wherein the first plug is provided with: a pin slot; a spring provided in the pin slot; and a pin, constrained within the pin slot and connected to the spring, the pin tending to eject outwardly of the pin slot under an action of the spring;
the pedal body is provided with a through-hole corresponding to the pin; the pin is capable of being inserted into the through-hole when the first plug is inserted into the connection cavity, to attach the cover plate to the pedal body.

7. The welcome pedal according to claim 1, wherein the air vent has an inlet side and an outlet side;
the inlet side is provided with a filter screen;
the fan blade is provided at a position of the air vent approximate to the outlet side, and a cross-sectional area of the air vent decreases gradually from the inlet side to the position where the fan blade is provided, and increases gradually from the position where the fan blade is provided to a position at the outlet side.

8. An electric pedal device for vehicle comprising:
a mount configured for being fixed to a side skirt of a vehicle body;
a pedal body configured for a driver or passenger to step on;
a driving device fixed to the mount and connected to the pedal body, enabling the pedal body to switch between an extended state and a retracted state when driven; and
a battery electrically connected to the driving device for powering the driving device;
wherein the driving device comprises:
an actuator, fixed to the mount;
a first linkage, one end if one first linkage being transmittingly connected to an output shaft of the actuator;
a second linkage, one end of one second linkage being transmittingly connected to the other end of the one first linkage; and
a third linkage, one third linkage being articulated between the mount and one end of the pedal body, another third linkage being articulated between the mount and the other end of the pedal body, and the other end of the one second linkage being transmittingly connected to the third linkage;
wherein under actuation of the actuator in a first direction, the pedal body is capable of outward swinging and downward shifting, bringing the pedal body into the extended state; and under actuation of the actuator in a second direction, the pedal body is capable of inward swinging and upward shifting, bringing the pedal body into the retracted state;
wherein the other end of the second linkage is articulated with a structure between two ends of the third linkage to obtain a first articulation center, and one end of the second linkage is articulated with the other end of the first linkage to obtain a second articulation center;

wherein when a ray starting at the second articulation center and passing through the first articulation center is defined as a first ray, and a ray starting at the second articulation center and passing through a rotation center of the output shaft is defined as a second ray, an angle between the first ray and the second ray is greater than or equal to 175° and less than or equal to 180° when the pedal body is in the retracted state.

9. The electric pedal device according to claim 8, wherein the output shaft comprises a threaded shaft segment, a frustum shaft segment, and an smooth shaft segment sequentially connected with each other in the same central axis; a small diameter end of the frustum shaft segment faces the threaded shaft segment, and a large diameter end of the frustum shaft segment faces the smooth shaft segment; the major diameter of the threaded shaft segment is smaller than a small diameter of the frustum shaft segment, one end of one first linkage is provided with a first through-hole, the first through-hole having a diameter greater than the small diameter of the frustum shaft segment and smaller than the large diameter of the frustum shaft segment; the threaded shaft segment passes through the first through-hole; and the electric pedal device further comprises a nut, which is screwed to the threaded shaft segment to press the one end of one first linkage against the frustum shaft segment.

10. The electric pedal device according to claim 8, wherein the electric pedal device further comprises a hooded stepped shaft and a pair of hooded bushings, the pair of hooded bushings being sleeved opposite each other onto a larger shaft of the hooded stepped shaft; the other end of the first linkage is provided with a second through-hole, the larger shaft of the hooded stepped shaft is threaded through the second through-hole, and the other end of the first linkage is sleeved between the pair of hooded bushings; one end of the second linkage is provided with a third through-hole, and a smaller shaft of the hooded stepped shaft is threaded through the third through-hole;

wherein, a shaft cap of one hooded bushing is clamped between a shaft cap of the hooded stepped shaft and the other end of the first linkage, and the smaller shaft of the hooded stepped shaft is interference fit with one end of the second linkage; a shaft cap of the other hooded bushing is clamped between one end of the second linkage and the other end of the first linkage, one end of the second linkage abuts against a step of the hooded stepped shaft.

11. The electric pedal device according to claim 8, wherein the electric pedal device further comprises a ball-socket connector and a ball-head bolt, the ball-head bolt being ball-articulated to the ball-socket connector; the ball-head bolt comprises a ball-head part and a bolt part connected with each other; the ball-socket connector comprises a ball-socket part and a connecting part connected with each other, the ball-head part being ball-articulated to the ball-socket part; the third linkage is provided with a first threaded hole between both ends, the bolt part being screwed to the first threaded hole; the other end of the second linkage is inserted into the connecting part.

12. The electric pedal device according to claim 8, wherein the first linkage is provided with flangings on both sides; a first press pattern is provided between both ends of the second linkage, a second press pattern is provided between where the third linkage is articulated to the mount and where the third linkage is transmittingly connected to the second linkage, and a third press pattern is provided between where the third linkage is transmittingly connected to the second linkage and where the third linkage is articulated to the pedal body.

13. The electric pedal device according to claim 12, further comprising a slider and a bolt; the driving device further comprises a connecting head, one end of the connecting head being articulated to the third linkage; the pedal body is provided with a track slot, the slider being provided in the track slot; the other end of the connecting head is formed with a countersunk hole, the slider is formed with a second threaded hole, and the bolt passes through the countersunk hole to be screwed with the second threaded hole, such that the pedal body is fastened to the connecting head.

14. The electric pedal device according to claim 13, wherein the slider is a T-shaped slider, the bottom of the slider being provided in the track slot; the connecting head is further formed with an accommodation groove in communication with the countersunk hole, the belly of the slider being partially accommodated in the accommodation groove.

15. The electric pedal device according to claim 8, further comprising a cushion fixed to the mount and a torsion spring provided at an articulated joint between the third linkage and the mount; one end of the torsion spring is fixed to the mount, and the other end of the torsion spring is fixed to the third linkage, wherein when the electric pedal device is in the extended state, a force of the torsion spring urges one side of the third linkage to abut against one cushion; when the electric pedal device is in the retracted state, a force of the torsion spring urges the other side of the third linkage to abut against the other cushion.

* * * * *